United States Patent
Gurin

(10) Patent No.: US 8,099,198 B2
(45) Date of Patent: Jan. 17, 2012

(54) HYBRID POWER GENERATION AND ENERGY STORAGE SYSTEM

(75) Inventor: Michael H. Gurin, Glenview, IL (US)

(73) Assignee: Echogen Power Systems, Inc., Akron, OH (US)

(*) Notice: Subject to any disclaimer, the term of this patent is extended or adjusted under 35 U.S.C. 154(b) by 991 days.

(21) Appl. No.: 11/860,151

(22) Filed: Sep. 24, 2007

(65) Prior Publication Data

US 2008/0211230 A1    Sep. 4, 2008

Related U.S. Application Data

(63) Continuation-in-part of application No. 11/161,144, filed on Jul. 25, 2005, now abandoned.

(60) Provisional application No. 60/826,899, filed on Sep. 25, 2006.

(51) Int. Cl.
G05D 29/00 (2006.01)
G05D 23/00 (2006.01)

(52) U.S. Cl. ..... 700/288; 700/276; 700/295; 180/65.21; 903/903

(58) Field of Classification Search .................. 700/288, 700/276, 295; 180/65.2, 65.21; 290/1 R; 903/903
See application file for complete search history.

(56) References Cited

U.S. PATENT DOCUMENTS

| | | | | |
|---|---|---|---|---|
| 4,182,960 A | * | 1/1980 | Reuyl | 290/1 R |
| 5,291,960 A | * | 3/1994 | Brandenburg et al. | 180/65.27 |
| 7,013,205 B1 | | 3/2006 | Hafner et al. | 701/22 |
| 2002/0082747 A1 | * | 6/2002 | Kramer | 700/276 |
| 2005/0162018 A1 | | 7/2005 | Realmuto et al. | 307/44 |
| 2005/0167169 A1 | * | 8/2005 | Gering et al. | 180/65.2 |
| 2006/0066113 A1 | | 3/2006 | Ebrahim et al. | 290/52 |
| 2006/0211871 A1 | | 9/2006 | Dai et al. | 549/208 |
| 2007/0001766 A1 | | 1/2007 | Ripley et al. | 330/279 |

* cited by examiner

*Primary Examiner* — Albert DeCady
*Assistant Examiner* — Steven Garland
(74) *Attorney, Agent, or Firm* — Edmonds & Nolte, PC

(57) ABSTRACT

An integrated and hybrid energy provider and storage device system for enhancing the energy efficiency and minimizing greenhouse gas emissions particularly for systems that utilize energy in a discrete and discontinuous manner, such as plug-in hybrid vehicles is provided. The system provides automated means to generate power, distribute the preferably locally generated power to a multiplex array of energy storage devices in a dynamic manner. The system, when utilizing dynamic algorithms, preferably meets the complex demands of often conflicting energy storage device requirements and real-time demand loads in-conjunction with dynamic switching between energy storage devices to enhance the performance and effectiveness that is beneficial to both the aggregate energy efficiency and the individual owner demands of each energy storage device.

16 Claims, 17 Drawing Sheets

Figure 6

| Utility Provider | Peak Demand $/kw | Time of Day Start | Time of Day Finish | Energy Equivalent for $/kwh | CO2 Emission Factor | Storage Efficiency Factor | Thermal Efficiency Temp (F) | Thermal Efficiency Factor | Available Sensor Node / # |
|---|---|---|---|---|---|---|---|---|---|
| Electric Utility A | 12 | 8:00 AM | 6:00 PM | 0.05 | 100% | 93% | 0 | 0% | Main/1 |
| Electric Utility A | 7 | 6:00 PM | 8:00 AM | 0.03 | 90% | 93% | 0 | 0% | Main/1 |
| Electric Utility B | 12 | 8:00 AM | 6:00 PM | 0.07 | 0% | 93% | 0 | 0% | Param/1 |
| Electric Utility B | 7 | 6:00 PM | 8:00 AM | 0.09 | 0% | 93% | 0 | 0% | Param/1 |
| Gas Utility A | 0 | 12:00 PM | 12:00 PM | 0.03 | 100% | 48% | 140 | 44% | Outdoor/1 |
| Local Wind | 0 | 12:00 PM | 12:00 PM | 0.05 | 0% | 100% | 0 | 0% | Outdoor/2 |
| Local Solar | 0 | 8:00 AM | 6:00 PM | 0.01 | 0% | 100% | 140 | 100% | Outdoor/3 |

Figure 7

| Energy Storage Device Type / SN# | Rate of Charge Limit kwh/hour | Present Charge kwh | Real-time Rate of Charge kwh/hour | Targeted Storage Required kwh | Projected Time of Day Start | Required Time of Day Finish | GPS Location | Rate Code / Rank # | Objective Code / Rank # |
|---|---|---|---|---|---|---|---|---|---|
| Battery-P23 / AB12 | 5 | 6 | 5 | 24 | 4:00 PM | 6:00 AM | Chicago, IL | Prem/1 | CO2-$-X3+ |
| Battery-X13 / AC1 | 3 | 2 | 2 | 32 | 6:00 PM | 8:00 AM | Chicago, IL | Prem/1 | CO2$2X1- |
| UltraCap-Z3 / CW1 | 1800 | 14 | 1600 | 19 | 8:00 PM | 11:30 PM | St. Paul, MN | Mem/2 | CO29$2X1- |
| UltraCap-T3 / WX- | 2000 | 11 | 1200 | 52 | 7:00 PM | 8:00 AM | Kenosha, WI | Mem/1 | CO2-$-X3+ |

Figure 8

| Energy | Date or Holiday | Peak Demand (kw \| gallons) | Time of Day Start | Time of Day Finish | Energy Equivalent kwh |
|---|---|---|---|---|---|
| Electricity Consumed | 1/1/2006 | 3.0 | 8:00 AM | 8:30 AM | 2.2 |
| Electricity Consumed | 1/1/2006 | 2.5 | 8:30 AM | 9:00 AM | 1.8 |
| Electricity Consumed | 1/1/2006 | 2.0 | 9:00 AM | 9:30 AM | 1.4 |
| Electricity Consumed | 1/1/2006 | 3.8 | 9:30 AM | 10:00 AM | 3.0 |
| Electricity Consumed | 1/1/2006 | 3.2 | 10:00 AM | 10:30 AM | 2.4 |
| ... | | | | | |
| Gas Consumed | 1/1/2006 | | 8:00 AM | 8:30 AM | 4.0 |
| Gas Consumed | 1/1/2006 | | 8:30 AM | 9:00 AM | 5.0 |
| Gas Consumed | 1/1/2006 | | 9:00 AM | 9:30 AM | 3.0 |
| Gas Consumed | 1/1/2006 | | 9:30 AM | 10:00 AM | 3.0 |
| Gas Consumed | 1/1/2006 | | 10:00 AM | 10:30 AM | 2.4 |
| ... | | | | | |
| Hot H2O Consumed | 1/1/2006 | 20 | 9:30 AM | 10:00 AM | 4.0 |
| Cold H2O Consumed | 1/1/2006 | 10 | 10:00 AM | 10:30 AM | 0.0 |
| ... | | | | | |
| Electricity Stored | 1/1/2006 | | 9:30 AM | 10:00 AM | 0.0 |
| Hot Water Stored | 1/1/2006 | | 10:00 AM | 10:30 AM | 1.1 |

Figure 9
Figure 9A
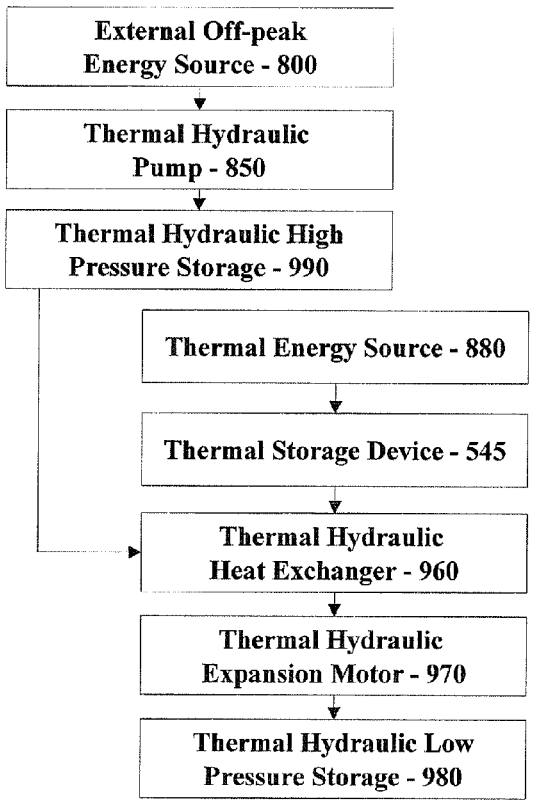
Figure 9B
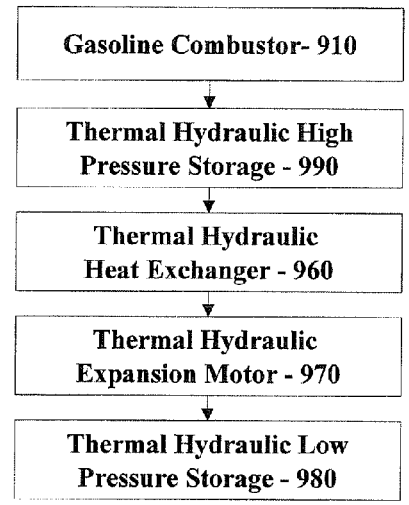
Figure 9C
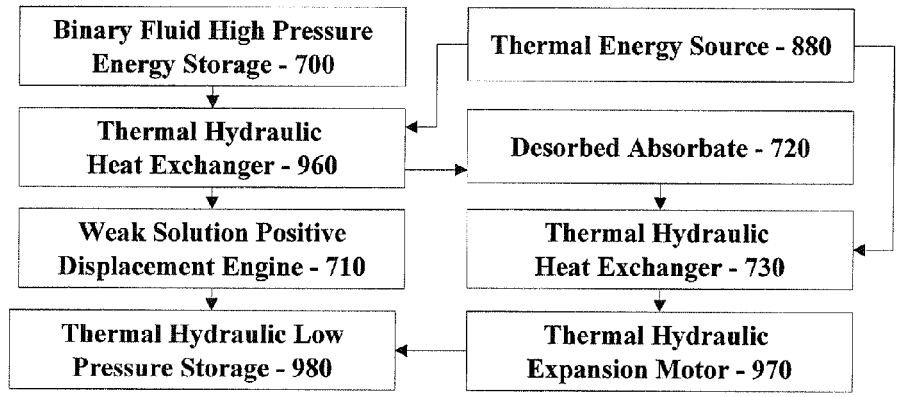

Figure 16

| | T1 = Beginning Temp (K) | T2 = Ending Temp (K) | P1 = Beginning Pressure (MPa) | P2 = Ending Pressure (MPa) | Beginning Gamma = Cp/Cv | Relative Cooling Capacity (T1-T2) |
|---|---|---|---|---|---|---|
| | 310 | 267.629 | 71 | 51 | 1.799277 | 42.371 |
| | 310 | 225.200 | 51 | 26 | 1.903413 | 84.800 |

Isothermal Data for T = 310.00 K

| Temperature (K) | Pressure (MPa) | Density (kg/m3) | Volume (m3/kg) | Internal Energy (kJ/kg) | Enthalpy (kJ/kg) | Entropy (J/g*K) | Cv (J/g*K) | Cp (J/g*K) |
|---|---|---|---|---|---|---|---|---|
| 310.00 | 71.000 | 1054.4 | 0.00094840 | 199.77 | 267.11 | 0.99861 | 0.92665 | 1.6673 |

Isothermal Data for T = 267.00 K

| Temperature (K) | Pressure (MPa) | Density (kg/m3) | Volume (m3/kg) | Internal Energy (kJ/kg) | Enthalpy (kJ/kg) | Entropy (J/g*K) | Cv (J/g*K) | Cp (J/g*K) |
|---|---|---|---|---|---|---|---|---|
| 267.00 | 51.000 | 1123.3 | 0.00089024 | 142.48 | 187.82 | 0.78713 | 0.94810 | 1.7469 |

Isothermal Data for T = 310.00 K

| Temperature (K) | Pressure (MPa) | Density (kg/m3) | Volume (m3/kg) | Internal Energy (kJ/kg) | Enthalpy (kJ/kg) | Entropy (J/g*K) | Cv (J/g*K) | Cp (J/g*K) |
|---|---|---|---|---|---|---|---|---|
| 310.00 | 51.000 | 1003.4 | 0.00099664 | 212.13 | 262.96 | 1.0479 | 0.91836 | 1.7471 |

Isothermal Data for T = 225.00 K

| Temperature (K) | Pressure (MPa) | Density (kg/m3) | Volume (m3/kg) | Internal Energy (kJ/kg) | Enthalpy (kJ/kg) | Entropy (J/g*K) | Cv (J/g*K) | Cp (J/g*K) |
|---|---|---|---|---|---|---|---|---|
| 225.00 | 26.000 | 1198.5 | 0.00083439 | 82.526 | 104.22 | 0.53376 | 0.98676 | 1.8384 |

HYBRID POWER GENERATION AND ENERGY STORAGE SYSTEM

CROSS-REFERENCE TO RELATED APPLICATIONS

This application claims priority to U.S. Provisional Patent Application Ser. No. 60/826,899, filed Sep. 25, 2006, for "Hybrid Power Generation and Energy Storage System". This application claims priority to and is a continuation-in-part of U.S. patent application Ser. No. 11/161,144, filed Jul. 25, 2005, for "Enhanced Energy Conversion and Manufacturing Method."

FIELD OF THE INVENTION

Hybrid power generators consisting of both thermally activated power generators, energy storage devices and combustion power generators, and more specifically to a distributed energy system in combination with plug-in-hybrid transportation devices are provided.

BACKGROUND

Various embodiments relate to operable modes for generating power to optimize the energy efficiency and minimize emissions associated with the power generation process by meeting both real-time and projected demands of individual and/or arrays of energy storage devices. The energy storage is both a primary energy form including electricity, compressed air, hydraulic and/or thermal hydraulic etc. and thermal energy resulting from the production of the primary energy form. The ability to meet the discreet and discontinuous power demands specific to hybrid plug-in "plug'n" vehicles, especially a fleet of vehicles places significant demands on the energy provider, particularly in terms of peak demand and aggregate energy efficiency.

U.S. Pat. No. 7,013,205, to Hafner, et al., issued on Mar. 14, 2006, for "System and method for minimizing energy consumption in hybrid vehicles" discloses a means of solely reducing the operating cost of a singular plug-in hybrid vehicle, but does not account for the energy efficiency or the creation of emissions during the generation of power whether said power is provided by on-board power generating means or by an external plug-in power provider. The U.S. Pat. No. 7,013,205 patent does not account for variability of on-board power generation or the provisioning of power from an external source such that the byproduct waste heat can be concurrently stored or utilized.

It would be beneficial to consider byproduct waste heat (most distributed power generation systems have over 60% of the total fuel content in the form of byproduct waste heat, and the best centralized power generation systems still have over 35% of the total fuel content in the form of byproduct waste heat) for both the power generating expense, and thus the opportunity for dynamic pricing to the plug-in hybrid vehicle.

The term "wireless" refers to the non-wired measures to establish communications. This includes, but is not limited to, infrared, radio frequency, cellular, radar, and power-line carrier.

The term "wired" refers to the use of physical electrical or optical connectivity to establish communications. This includes, but is not limited to, the use of serial, parallel, USB, Firewire, Ethernet, optical fiber, and RS-485 port communication.

The term "algorithm" refers to calculations, rules, and parameter values utilized to determine the change of state in a deterministic manner.

The terms "transportation device" and "vehicle" are used interchangeably, both having the meaning of a mobile device that has integral capabilities of being non-stationary.

The term "HyGaSS" is the acronym for hybrid energy generation and storage system.

The terms "household" and "residence" are used interchangeably, both having the meaning of a place for people to live. It inherently can be, for example, a condominium, apartment, home, town-home, or the aggregate of individual households as a neighborhood or community.

The terms "Plug-in hybrid" and "Plug'n hybrid" are used interchangeably, both having the meaning of a device capable of obtaining directly useful energy from external sources or generated on-board. One such example is the use of electricity from the grid and an on-board combustion engine driving a DC generator.

The term "hydraulic" energy refers to the utilization of a pressurized fluid, which is generally incompressible, to store and/or transmit power.

The term "thermal hydraulic" fluid refers to the utilization of a pressurized fluid, which generally has increasing pressure at increasing temperatures. A thermal hydraulic fluid is a compressible fluid, with one exemplary being supercritical CO2. Another example is a binary fluid whereby CO2 is absorbed into the absorbent.

Various embodiments of the present invention relate to energy generation, and more particularly to power generation employing dynamic switching to an array of energy storage devices having unique prioritization and energy demand profiles.

Additional embodiments may further include the means to utilize byproduct waste heat in a manner that enables the asynchronous utilization and production of the primary energy form and thermal energy.

Additional embodiments yet further include the means to utilize stored energy from either a working fluid such as compressed air, which also includes pure gases such as carbon dioxide, or a thermal hydraulic fluid in combination with heat produced concurrently or collected from a thermal energy storage device to increase the enthalpy of the working fluid.

Additional embodiments feature the concurrent production of pressurized working fluid by a primary engine that is subsequently heated to increase the enthalpy by the primary engine waste heat.

Additional embodiments provide a method of controlling the discharge rate of a pressurized working fluid as a function of distance to a destination, calculated energy consumption to the destination, and stored energy of the working fluid.

Additional embodiments are directed to the method of controlling a discharge rate of the pressurized working fluid into a minimum of two stages. The preferred first stage discharge pressure and temperature occurs within the desorption range of a working fluid and a gas. A preferred second stage discharge pressure and temperature occurs prior to the phase transition of the gas from second to third stage into a liquid.

Additional embodiments include the utilization of a relatively high temperature source to desorb a working fluid from an absorbent surrounded by a series of heat exchangers with the prior heat exchanger serving as a preheat stage and the latter heat exchanger serving as a heat recovery device in order to minimize the demand of the relatively high temperature source.

Various embodiments provide a new and high efficiency means of providing power to energy storage devices and methods of use.

Additional features and advantages of the various embodiments are described herein and will be apparent from the detailed description of the presently preferred embodiments. It should be understood that various changes and modifications to the presently preferred embodiments described herein will be apparent to those skilled in the art. Such changes and modifications can be made without departing from the spirit and scope of the present invention and without diminishing its attendant advantages. It is therefore intended that such changes and modifications be covered by the appended claims.

SUMMARY

A high efficiency, environmentally friendly power generation process is provided. The process uses the combination of a primary energy generator with integral thermal waste heat recovery to increase the overall efficiency. The further incorporation of a thermodynamic hydraulic pump increases the energy efficiency, especially in combustion power generation cycles, as it eliminates a substantial portion of energy utilized for compression prior to combustion and/or reduces the energy losses associated with traditional combustion power generating cycles.

One aspect of various embodiments is to integrate a thermal hydraulic fluid with integral power generation capabilities as a means of increasing total power conversion and coefficient of performance.

BRIEF DESCRIPTION OF DRAWINGS

FIG. 6 is a table depicting one exemplary relationship between numerous parameters for a given Utility Provider.

FIG. 7 is a table depicting one exemplary relationship between numerous parameters for a given Energy Storage Device.

FIG. 8 is a table depicting historic energy usage.

FIGS. 9A, 9B, and 9C are a series of schematic diagrams illustrating a thermal hydraulic energy storage device with integral enthalpy increase by a thermal energy source.

FIG. 16 are thermophysical property tables for one dual expansion stage thermal hydraulic energy conversion device.

DETAILED DESCRIPTION OF THE PREFERRED EMBODIMENTS

Figure 1:
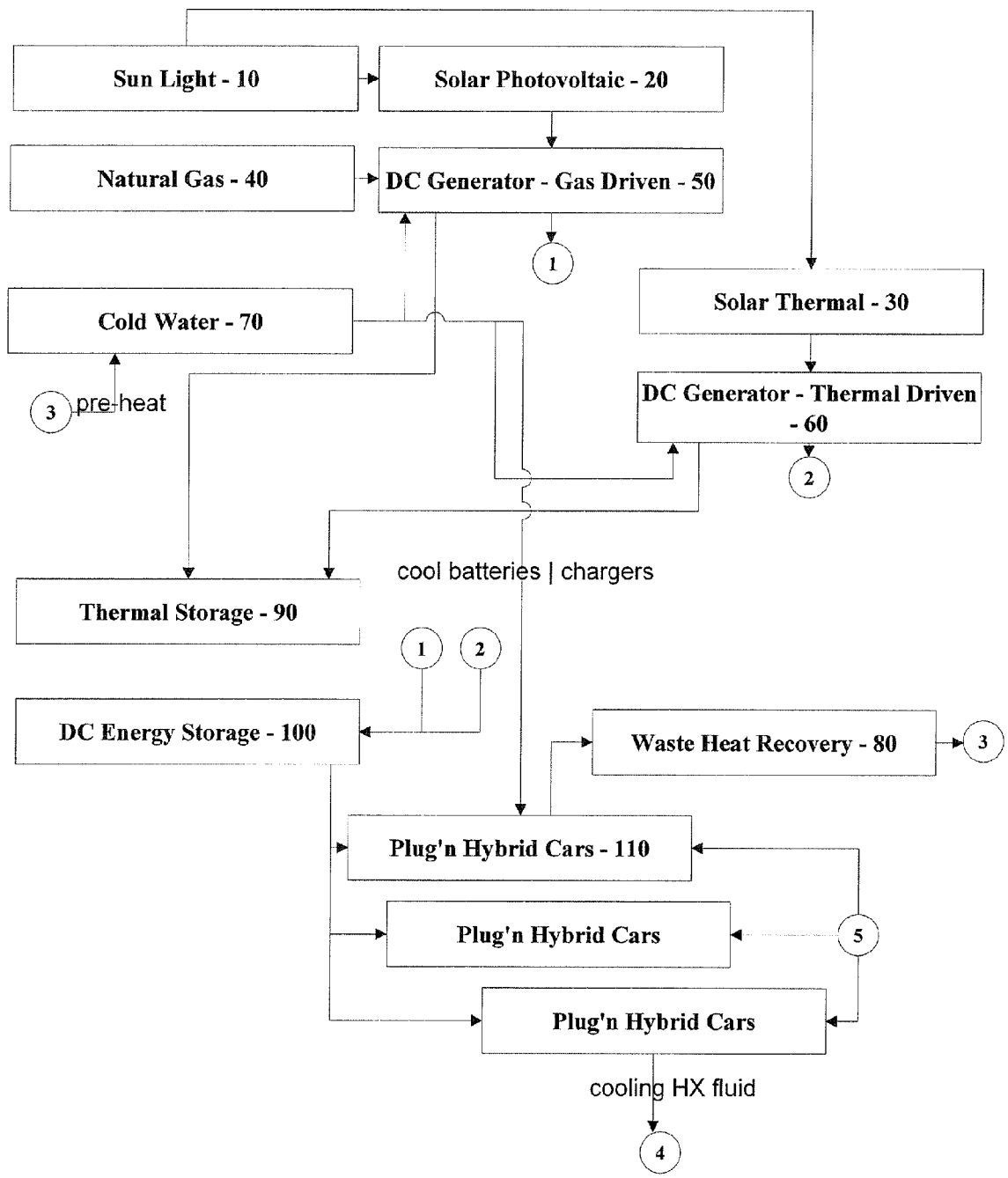
FIG. 1 is a schematic diagram depicting energy inputs, primary and byproduct waste heat production, to storage from energy providers to plug-in hybrid devices.

The charging of energy storage devices presents opportunities and challenges that are distinct for most energy consumers. The first and most important distinction is when both the energy provider and energy storage device(s) are entirely off-grid. The result is the avoidance of many costly components including phase synchronizer, AC-DC converters, and voltage regulators, which are either eliminated or significantly simplified. The elimination of such components also reduces the associated energy inefficiencies thus contributing to lower emissions, operating costs, and maintenance costs. These benefits further reduce the hurdles for on-site generation, which leads to more opportunities for distributed generation.

HyGaSS, or hybrid energy generation and storage system as described herein, optimizes the aggregate of both energy production for energy storage device(s) and useful byproduct waste heat operable to control the production, transmission and storage of electrical or hydraulic energy and byproduct waste heat into a plurality of energy storage devices. HyGaSS may further comprise a control system that is operable to vary the flow of energy into said energy storage device(s), and a multiplexer for selectively and individually actuating the supply of energy to said energy storage device(s). HyGaSS may further specifically determine the power generation schedule and profile in accordance to both the primary energy storage demands and the secondary thermal energy storage demands as an aggregate. Typical single cycle power generation, which is on the order of about 30% efficiency, creates on the order of about 60% plus thermal energy, thus the primary energy product is, in fact, less critical to the overall energy efficiency than the secondary thermal energy byproduct.

As noted in copending U.S. patent application Ser. No. 11/161,144, optimal generation of energy requires the ability of energy storage devices having both primary energy storage capacity, and secondary waste byproduct energy storage capacity. HyGaSS is further operable to control the generation of primary energy wherein at least about 1 percent of said generated primary energy is utilized within an energy storage device and the balance of the power is preferably delivered to a distributed energy storage, energy transmission system, or combinations thereof. The integral capability of both storing and distributing the primary energy source is a further means of obtaining asynchronous energy generation and energy utilization.

One embodiment of HyGaSS provides for the integration of the utility grid connected to a DC converter operable as a means to reduce operating costs in accordance to a multi-parameter minimization function of utility peak demand and time of day rate structure, plus a DC cogeneration system through a DC-DC converter such that input DC voltage and amperage are variable operable to provide energy for energy storage devices including battery storage and ultra-capacitor storage, and thermal loads.

HyGaSS may further utilize energy consumption history by day, holiday, etc. in combination with battery charge capacity, rate of charge information, etc. to calculate a targeted power requirement with a targeted completion time. The resulting power generation schedule and profile is based on the aggregate of all plug-in hybrid vehicles within the network of plug-in hybrid clients, whether said vehicles are actually currently connected or historically anticipated to be connected within a projected time window, in order to create the optimal battery charger profile. Means to anticipate the projected time window is, in part, based on the real-time global positioning system "GPS" location of each individual vehicle to determine the likelihood of said vehicle's energy storage device matching the projected time window arrival time.

In another embodiment, HyGaSS is further operable in accordance to the combined system (i.e., utility grid and DC cogeneration system) such that minimal emissions (i.e., carbon dioxide "CO2") are produced. In other words, an operating mode for HyGaSS may result in the lowest emission levels, lowest energy input costs, or lowest combined aggregate of emission costs, emission avoidance costs, and energy input costs in order to produce both primary and secondary energy as compared to lowest simple operating costs of fuel input and maintenance. One exemplary situation in the advance scenario is accounting for the potential disparity between utility off-peak demand from coal having lower electricity costs than on-site primary power generation with input fuel being natural gas, though the aggregate with emissions costs and avoidance costs by utilization of secondary power generation offsetting the fuel and maintenance cost benefit. Another yet more comprehensive exemplary is an optimal operating profile that accounts for at least one parameter selected from the group consisting of peak demand, energy storage charger performance (i.e., pulsed charge, allow for charger/storage device cooling, etc., lowest total cost (includes waste heat from distributed generation) vs. electrical grid power (demand, peak, off-peak costs, CO2 emission) vs. DC generator operating cost (demand, peak, off-peak, maintenance, CO2 emission, etc.), demand for waste heat (includes absorption cooling, liquid desiccant recharging, domestic hot water), and energy storage device priority rate code (provides relative priority as a function of $1^{st}$ to charge, $1^{st}$ to finish, cumulative charge within given time window).

In yet another embodiment, HyGaSS is operable to control the production, transmission and storage of electrical and/or hydraulic energy by at least one energy provider into at least one electrical and/or hydraulic energy storage device and the storage of byproduct waste heat into at least one thermal energy storage device, and a control system operable to vary the flow of energy into said energy storage device, wherein the production of said energy is variable as a means of optimizing the aggregate of energy production for energy storage device and utilization of byproduct waste heat. As noted earlier, many energy generation devices create more byproduct energy than primary energy. Thus, in another embodiment of HyGaSS, an energy provider is operable to vary the flow of "primary" energy and byproduct waste heat to both an onboard energy storage device of a plug-in hybrid vehicle and to energy and thermal storage device(s) external of the plug-in hybrid vehicle.

A typical American household will own at least two vehicles, thus the household has significantly more energy generation capacity than the household will utilize, whether it be in the form of "primary" energy or byproduct waste heat. Based on recent U.S. Department of Energy (DOE) Annual Energy Outlook reports, residential and commercial buildings account for 36% of the total primary energy use in the United States, and 30% of the total U.S. greenhouse gas emissions. About 65% of the energy consumed in the residential and commercial sectors is for heating (46%), cooling (9%) and refrigeration (10%); in principle this energy can be provided by non-concentrating solar thermal systems. The DOE reports conclude that based on population density and climate, 75% of U.S. households and commercial buildings are appropriate candidates for non-concentrating, solar hot water systems. The same conclusion can be reached for HyGaSS due to the significant creation of byproduct waste heat.

As is often the case in cogeneration, the amount of available byproduct waste heat exceeds the creation of electricity. Thus, the ideal complimentary energy storage system is the direct integration of low temperature endothermic and reversible reaction (i.e., thermochemical) as a means of transforming the byproduct waste heat into a chemical which can return to its original form preferably using a fuel cell type device as a means of producing electricity at the appropriate demand consumption period.

Distributed energy generation has many distinct advantages, thus utilizing the excess capacity of said vehicle to generate power enables a reduction of unnecessarily redundant capital costs. More importantly, the byproduct waste heat created by either/both vehicle power generation or energy storage device cooling displaces at least a significant portion of the thermal energy utilized at the host site (e.g., household). Preferably, HyGaSS is operable to vary the flow of heat transfer fluid as a means to provide both active cooling to the energy storage device and to recover byproduct waste heat during the charging process. This energy can be stored within an on-board thermal energy storage device, transferred to an external thermal energy storage device, or utilized to provide a heated heat transfer fluid to an external consumer of said thermal energy. Additional embodiments of HyGaSS further contemplate operating the energy generation device with said vehicle at times when the vehicle is stationary in order to meet, at least in part, the host's primary energy requirement. Thus one embodiment further comprises a distributed energy generator that is actually on a mobile transportation device (i.e., vehicle) such that it provides local primary energy (e.g., electricity) and hot water to the connected energy storage device (i.e., in other words the vehicle provides the hot water or onboard phase change material "PCM" and electricity to the residence. The energy generator provides electricity to the on-board energy storage and/or host facility real-time demand usage or projected host facility energy storage device. One preferred embodiment has a non-linear algorithm to determine which device to charge first, or an optimal energy charger profile as a function of parameters including real-time cost differential, projected cost, CO2 emissions, etc.

One preferred embodiment of HyGaSS has a control system operable to vary the flow of energy into both an onboard energy storage device and an external stationary energy storage device by a multiplexer for selectively and individually actuating the supply of energy to said energy storage devices. And one particularly preferred embodiment is further comprised of means to provide byproduct waste heat to at least one thermal energy storage device selected from the group consisting of onboard thermal storage device, external stationary thermal storage device, and combinations thereof.

To realize the fullest extent of the HyGaSS benefits, HyGaSS may be operable to control the production and storage of a plurality of energy storage devices including energy storage devices within a plurality of plug-in hybrid vehicles. Preferably, HyGaSS may be further comprised of both a local control system and a distributed network control system operable to vary the flow of energy into said energy storage devices, and a multiplexer for selectively and individually actuating the supply of energy to said energy storage devices wherein said control system creates an optimal energy storage device charger profile. The profile is created by having parameters and inputs including at least one selected from the group consisting of global positioning system data, historical data, and real-time performance data as a means to predict both anticipated arrival time and likelihood of vehicle arrival, energy requirement upon arrival, and combinations thereof.

The HyGaSS distributed network control system is comprised of automated real-time controllers and network communication as known in the art (e.g., wireless, broadband, DSL, etc.) to communicate with the automated real-time controllers to coordinate a complex strategy in order to create an optimal energy storage device charger profile that minimizes at least one strategy objective selected from the group consisting of peak energy demand, aggregate energy production expenses and emissions created during energy production, and combinations thereof. Alternatively or additionally, the HyGaSS optimal energy storage device charger profile preferably maximizes at least one strategy selected from the group consisting of revenue resulting from the production of energy, aggregate energy efficiency, and aggregate energy utilization, and combinations thereof.

The optimal placement location for the energy generation provider is at a location that can maximize the utilization of the byproduct waste thermal load. This feature is in common with cogeneration known in the art. However, cogeneration equipment is operable simply on the demands of the primary energy source (i.e., electricity) rather than byproduct waste heat, or more complex strategies. The ideal hosts for HyGaSS are facilities having a significant thermal load requirement. Thermal loads, which are easily stored using means known in the art (e.g., phase change material "PCM") to enable asynchronous generation and utilization, are varied from traditional including, but not limited to, heating, domestic hot water, and process heat, to non-traditional including, but not limited to, absorption cooling, liquid desiccant cooling, bottom cycle power generation, and preheating for solar thermal system.

Referring to FIG. 1, a series of energy sources are depicted including at least one from the group consisting of Sun Light 10 which is transformed into useful energy via either a Solar Photovoltaic 20 or Solar Thermal 30 energy conversion device that drives respectively a DC Generator that is gas driven 50/DC-DC converter or a thermally driven DC Generator 60, or fuels including Natural Gas 40 that can drive a power generator such as gas driven DC Generator 50. The reference to fuels includes natural gas and may include, for example, biomass, hydrogen, gasoline, or other combustibles. Additional fuels further include non-traditional fuels such as nanoscale magnesium, which yields an exothermic reaction when reacting with oxygen into an oxide. The energy generated by either gas driven or thermal driven DC Generator is stored in a DC Energy Storage device 100. The range of devices includes capacitors, ultra-capacitors, batteries, etc. The byproduct waste heat from either DC Generator is stored in a Thermal Storage device 90 by either heating Cold Water 70 directly from its source or raising the temperature further following preheating from the plug-in vehicle on-board Waste Heat Recovery device 80. The Cold Water can recover further waste heat resulting from the battery chargers or batteries prior to providing active cooling to the Plug'n Hybrid Cars 110. The Cold Water finally exits the HyGaSS via point "4". The numbered indicators 1, 2, and 3 are connecting points to provide a cleaner figure without too many interesting lines.

Furthermore, another class of ideal host is a traditional aggregation point (i.e., place where plug-in hybrid vehicles visit frequently) including delivery companies (e.g., USPS, UPS, FedEx, etc.), service companies (e.g., telephone, utility, cable, contractors, etc.) manufacturing facilities, supermarkets, shopping malls, condominiums/apartments, parking lots, rental car companies, transportation companies (e.g., airlines, buses, etc.), and traditional refueling points (e.g., gas/petrol stations).

HyGaSS contemplates not only the generation of byproduct waste heat, but again enables the primary energy and byproduct waste heat to be asynchronous both from each other, and, in fact, entirely from the consumer of either/both the primary and byproduct energy. The integral and inherent energy storage capabilities enable control strategies to be both more controllable and complex. In one embodiment, HyGaSS is comprised of a control system operable to dynamically vary the flow of energy into at least one energy storage device wherein said control system determines an optimal charger profile having inputs based on at least one parameter selected from the group consisting of energy storage device energy requirements, energy storage device earliest start time, energy storage device latest finish time, energy storage device priority code, and energy storage device revenue code, and at least one parameter selected from the group consisting of byproduct waste heat energy requirements, real-time byproduct waste heat demand including at least one user selected from the group consisting of absorption cooling, liquid desiccant recharging, domestic hot water, byproduct waste heat storage capacity, and combinations thereof.

The complexity of the control system strategy is a direct function of access to data both in terms of real-time and historic data. Access is, in large part, determined by the capability to communicate both locally and at large. The more data obtained yields more powerful results by the utilization of advanced modeling techniques known in the art including neural networks, non-linear analysis, artificial intelligence, predictive modeling, etc. Thus, in one embodiment, HyGaSS is further comprised of a control system operable to communicate between at least one electric storage device and at least one energy provider. A more preferred embodiment is further comprised of a connector having integral and automated means to obtain at least one electric storage device parameter selected from the group consisting of identity information, model, owner profile, maximum energy storage rate, maximum charging temperature, minimum voltage, and maximum voltage, and combinations thereof.

Figure 2:
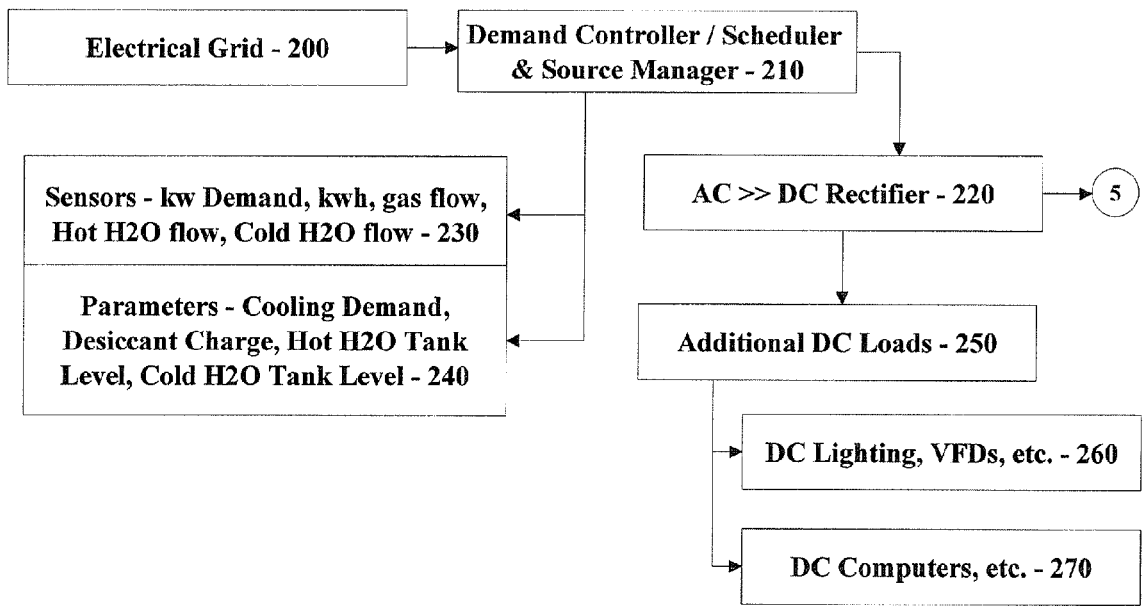
FIG. 2 is a schematic diagram depicting demand control and integral components to its functionality.

Referring to FIG. 2, a representative scheme of energy demand managers limit the peak load on the energy provider, which, in this case, is represented as the Electrical Grid 200. Subsequently the Demand Controller 210 monitors a range of sensors 230 including demand, kwh, gas flow, hot water flow, cold water flow, and controls a range of loads 250 after ensuring that the AC energy source is transformed to DC via the AC-DC Rectifier 220. The output from the AC-DC Rectifier drives a range of devices requiring DC energy including DC Lighting 260, variable frequency devices "VFDs", DC Computers 270, or via point "5" to either DC Energy Storage devices as depicted in (FIG. 1-100) or Plug'n Hybrid Cars (FIG. 1-110).

A particularly preferred embodiment of HyGaSS is operated to minimize the aggregate of at least one parameter selected from the group consisting of energy utilization, energy production emissions, energy costs to owner of the energy storage device, charge time for current connected energy storage devices, time to store energy levels of stationary energy storage device to a specified energy percentage of level, or combinations thereof. A particularly preferred embodiment of HyGaSS is operated to maximize the aggregate of at least one parameter selected from the group consisting of energy efficiency, revenue, stored energy levels of stationary energy storage device as a means to anticipate short-term demand, utilization of byproduct waste heat, or combinations thereof.

Once the identity information is known, HyGaSS may be operable with automated means to determine real-time energy charger requirements as a function of data including at least one data set for each energy storage device selected from the group consisting of historic performance data, projected energy requirements prior to subsequent energy charging opportunity, energy storage device owner profile for energy cost versus emissions minimization ratio, and combinations thereof.

Once the comprehensive data is known at the individual level, HyGaSS may be further comprised of automated means to determine the optimal production schedule for the energy provider to the aggregate of each energy storage device as a means to minimize the aggregate energy and byproduct waste heat cost and vary the real-time energy production level to vary the flow of energy into said energy storage devices with a multiplexer for selectively and individually actuating the supply of energy to said energy storage devices as a function of at least one energy provider parameter. Optimizing these elements may require a significant number of unique parameters. Some of these additional operating parameters and modes are for both energy storage device and energy provider.

Figure 3:
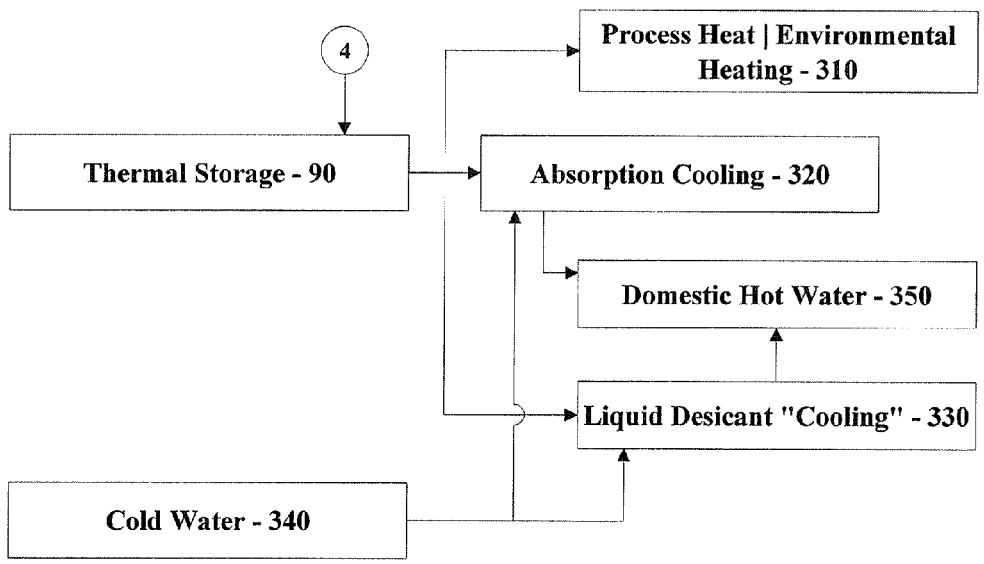
FIG. 3 is a schematic diagram depicting the flow of byproduct waste heat.

FIG. 3 illustrates the flow of byproduct waste heat, which begins from point "4" of FIG. 1. This waste heat can be temporarily stored in a Thermal Storage device 90, or be utilized by a range of devices driven by thermal energy including Process Heat 310, Absorption Cooling 320, Liquid Desiccant Cooling 330, or simply Domestic Hot Water 350. An optional waste heat recovery point can transform city Cold Water 340 from the Liquid Desiccant Cooling system as a means of providing additional Domestic Hot Water.

Additional preferred parameters include Boolean user defined parameters for operating at maximum local generation levels and maximum grid electric input levels independent of peak demand Yes/No, same as before but within prior established peak demand level Yes/No, and/or same as before but enabling part of recharging to take into account tiered grid rate structure Yes/No. The ability to orchestrate each individual component within the context of the aggregate of all components enables the optimal solution to be realized while respecting the personal objectives to the largest extent possible (or feasible).

In one embodiment, HyGaSS is operable to charge a specified energy storage device wherein each individual energy storage device has a designated charging mode selected from the group consisting of instant full charge, instant partial charge to a specified energy storage percentage or level, a specified energy storage percentage or level with a specified time, a first charge objective specified minimum energy storage percentage or level within a specified time and a second charge objective specified maximum energy storage percentage or level within a specified time, minimize cost per unit of energy to charge said energy storage device, minimize emissions resulting from production of energy for said energy storage device, maximize the utilization of energy provided by an alternative energy source, and combinations thereof.

In another embodiment, HyGaSS is operable to charge a specified energy storage device wherein each individual energy storage device has a designated prioritizing mode selected from (a) charge to minimize cost per unit of energy to owner of said energy storage device, (b) charge to minimize production cost per unit of energy to owner of said energy provider operate to minimize charge time, (c) charge to maximize charge, and/or (d) charge at highest priority.

A preferred embodiment of HyGaSS provides a parameter input means that is rapid and safe, including an automated method to identify the hybrid storage device. Said means include a user interface, whereby said user interface is at least one device selected from the group consisting of plug-in hybrid onboard user interface, plug-in connector between energy provider and energy storage device, and a stationary user interface at the energy provider.

The energy storage device and the energy generator provider preferably have means to communicate between each other using network communications. One preferred communication means is immune to electrical noise, such as an infrared transceiver. A particularly preferred communication means is embedded as an integral component of the connector between the electric storage device and electricity provider. One specifically preferred integral component has automated means to provide alignment between the electric storage device transceiver and electricity provider. Additional wireless and wired means are contemplated as feasible communication devices including power line carrier, RF transceivers, RFID, USB port, etc. A preferred energy provider controller further establishes bi-directional communication with the energy storage device controller. A particularly preferred energy provider controller is such that the energy storage device controller becomes a node of the communication system. A specifically preferred energy provider controller has equivalent access to energy storage device sensors, real-time data, and historic performance data.

A preferred connector has further means of obtaining with automated means the identity of each individually connected energy storage device. A particularly preferred connector has said identity means embedded into the connector. A specifically preferred connector within the control system has the means to access data including at least historic performance data, data including parameters to anticipate projected energy requirements at least till next opportunity for energy charging (one can charge a fixed service fee such that it manages between a series of distributed charges in order to manage costs | emissions | total energy availability in accordance to owners preference). Preferably, the connector has yet further means of providing heat transfer fluid as a means to both provide active cooling to the energy storage device and to recover byproduct waste heat during the charging process. Another preferred feature of the connector is the further means of withdrawing hot active cooling heat transfer fluid from plug-in vehicle as a means of utilizing waste heat generated from said vehicle (i.e., transportation device). Said vehicle may further be equipped with a phase change material device as a means to reduce energy storage byproduct waste heat specifically or more broadly waste heat resulting from auxiliary fuel consumed engine/fuel cell, etc. during the time in which energy storage device is being recharged.

In various embodiments, further additional features may include: the connector has an integral alignment means for both communication and energy flow means between electric storage device and energy provider; the energy storage device controller establishes bi-directional communication with the energy storage device controller by automated means of becoming an active communication node on the same network as the energy provider; the energy storage device controller has communication means to energy storage device sensors, real-time data, and historic performance data; the connector is operable to withdraw hot active cooling heat transfer fluid from plug-in hybrid vehicle as a means of utilizing byproduct waste heat generated from said vehicle.

Figure 4:
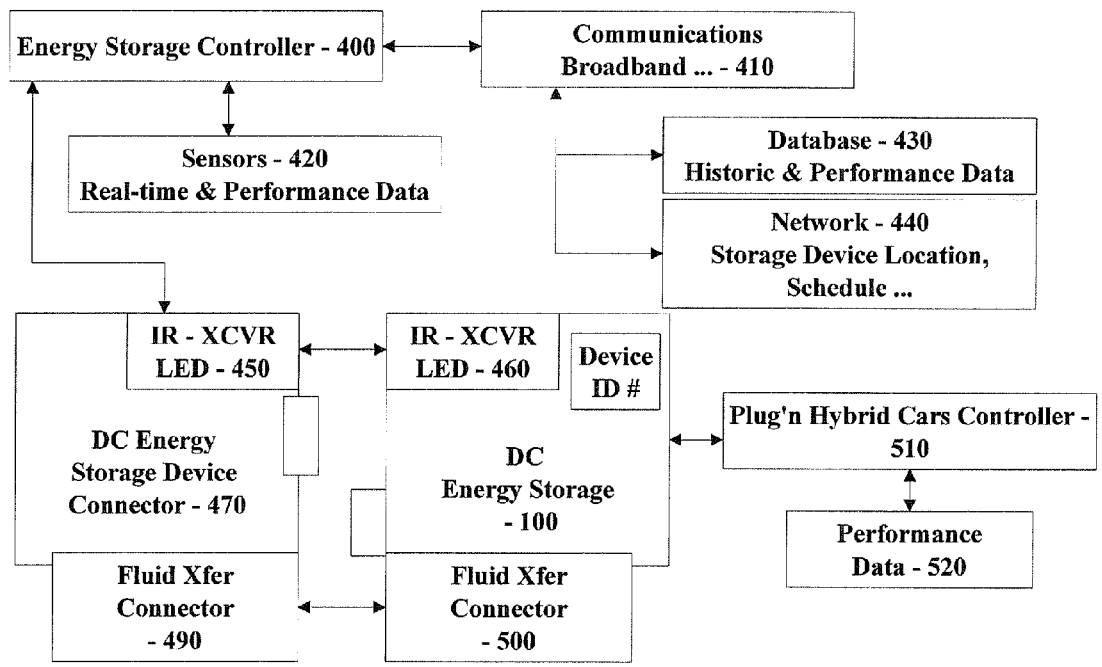
FIG. 4 is a schematic illustration of communication links between energy providers and plug-in hybrid plus integral components for data optimization and heat transfer fluid connection.

Referring to FIG. 4, various preferred communications and connection methods of use with HyGaSS are shown. In the embodiment illustrated, the Energy Controller 400 is the main node for both communications and control at the local level. The Energy Controller obtains data via Communications Broadband 410 methods known in the art and via short-range protocols to obtain real-time and performance data from Sensors 420, which includes methods known in the art as RS-485, Echelon, BacNet, etc. The Communications Broadband methods provide access to the Database 430 and Network 440 to respectively provide historic and performance data, and storage device location, schedule, etc. (i.e., such as in Plug'n Hybrid Cars in FIG. 1-110). The Energy Controller utilizes the integral energy storage device connector, here being depicted as the DC Storage Device Connector 470. The DC Storage Device Connector has integral communications device depicted here as an infrared LED transceiver 450, "IR-XCVR" and a Fluid Transfer "Xfer" Connector 490. The LED transceiver provides direct communication to the connected DC Storage Device 100 via its LED transceiver 460 and preferably in an automated means provides the actual Device ID#, which serves as the look-up value for access to data including historic, performance, command instructions, on-board vehicle user interface, etc. The Fluid Xfer Connector 490 transfers heat transfer fluid to the DC Storage Device 480 via its Fluid Xfer Connector 500. The preferred embodiment is such that the DC Storage Device connector 500 is also a node on the Plug-In vehicles communication bus having direct access to the Plug-In Transport Controller 510. The result is such that direct access is obtained to Performance Data 520 enabling real-time data, historic performance data, energy storage device specifications, etc. to become part of the HyGaSS optimization scenarios.

The significant movement and transfer of thermal energy are best achieved with a heat transfer fluid having a significant energy storage capacity. Preferred heat transfer fluids for the energy storage device cooling and/or thermal energy storage include microemulsion or nanoemulsion phase change materials, non-phase change materials including water, heat transfer fluids with high sensible heat levels/kg, and combinations thereof. Particularly preferred heat transfer fluids are selected from the group consisting of ionic liquids, combination of ionic liquids and poly(ionic liquid) polymers as electricity generation device bottom cycling, or ultra-capacitor cooling, or circulating fluid into electric storage device and/or charger circuit. A particularly preferred heat transfer fluid is comprised of a heat transfer fluid comprised of at least one ionic liquid and at least one poly(ionic liquid) polymer.

A preferred embodiment of the heat transfer fluid is utilized as a means of at least one function selected from the group consisting of bottom cycle energy production, energy storage active cooling, energy storage device charger cooling, and combinations thereof, and as a means of recovering byproduct waste heat. HyGaSS may be further comprised of a phase change thermal storage device as a means to increase utilization of byproduct waste heat resulting from energy storage device recharging.

A preferred embodiment of the energy storage device are energy storage devices in which energy is generated either by distributed or centralized means including thermal-hydraulic energy storage, battery storage, electrochemical energy storage, thermal storage, hydraulic energy storage, magnetic energy storage, flywheel energy storage, or combinations thereof.

Figure 5:
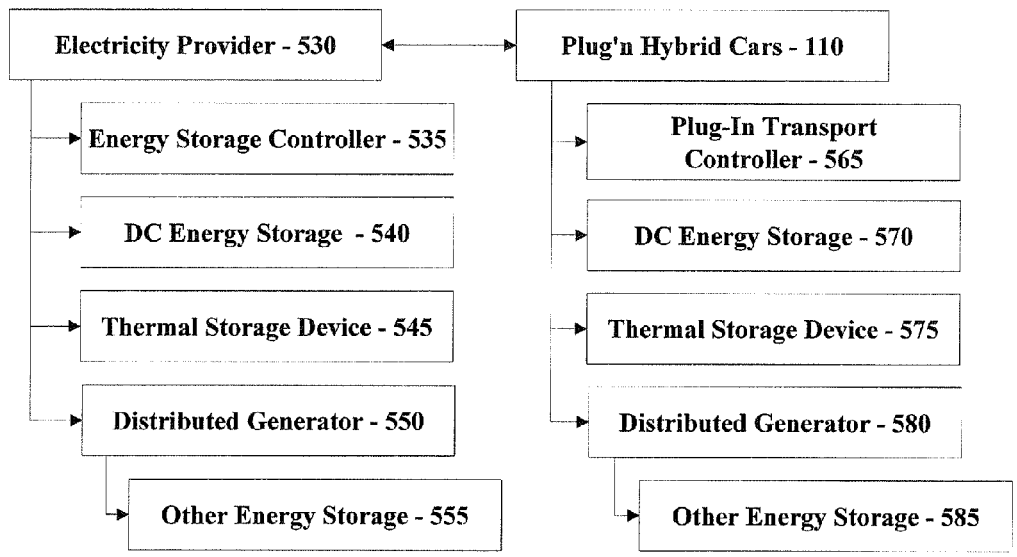
FIG. 5 is a schematic diagram depicting the integration of both energy providers and plug-in hybrid devices with the range of integral components.

FIG. 5 illustrates one possible integrated scenario combining a wide range of energy providers and storage devices in order to provide optimal performance. Each of the following can represent multiple numbers of devices, which can be within one physical location, distributed within a region, or amongst all devices registered as clients. The general consensus is such that an energy provider depicted here as an Electricity Provider 530 provides energy to a Plug'n Hybrid Cars 110. The Plug'n Hybrid Car 110 has an on-board Plug-In Transport Controller 565, a DC Energy Storage Device 570, a Thermal Storage Device 575, and an on-board Distributed Generator 580 that may have an additional Other Energy Storage device 585 that could be hydraulic, compressed air or the like. The Electricity Provider 530, which is also used interchangeably in this context as the Plug-In Transport Device stationary host, preferably has at least one local controller Energy Storage Controller 535. The preferred embodiment has stationary energy storage device(s) here depicted as DC Storage Device 540. It is further comprised of a stationary Thermal Storage Device 545. And yet further comprised of a Distributed Generator 550 providing local byproduct waste heat for local utilization, as a means of increasing the total efficiency. The stationary Distributed Generator 550 may optionally have additional energy storage capabilities in a different form, such as compressed air, depicted here as Other Energy Storage 555.

The combined features of HyGaSS preferably enable dynamic pricing to be achieved whereby the price of energy output provided to energy storage devices varies dynamically in accordance to the aggregate energy efficiency and emissions minimization of the energy providers.

Referring to FIG. 6, one exemplary relationship between numerous parameters for a given Utility Provider is shown. The parameter Peak Demand is the economic cost per peak unit of energy provided. The peak demand often has an associated start time and end time, which are respectively shown as Time of Day Start and Time of Day Finish. Each unit of energy provided also has at least energy rate, which is shown as Energy Equivalent for $/kwh. For instances where time of day rates are available, it may also have a separate start and end time. Each Utility Provider, which is the generator of energy, has various degrees of CO2 emissions per unit of energy produced thus being depicted as a normalized number CO2 Emission Factor. Each Utility Provider provides a specific form of energy, such as electricity, which has the ability to be stored for subsequent use. Energy storage yields varying degrees of energy losses, which is depicted as Storage Efficiency Factor whereby unity is loss-less storage. Each Utility Provider yields byproduct waste heat, which is depicted both as a Thermal Efficiency Factor (i.e., how much useful thermal energy is produced per input unit of fuel) and an output temperature depicted as Thermal Efficiency Temperature. Lastly, FIG. 6 provides a communications parameter indicating the method of communications and the node. Main is indicative of a wired broadband Internet connection, Param is indicative of a local parameter on the controller, and Outdoor is indicative of a wireless connection.

Referring to FIG. 7, one exemplary relationship between numerous parameters for a given Energy Storage Device is illustrated. The parameter Energy Storage Device Type/SN# provides the necessary information to ensure safe and efficient energy storage. Types depicted include Battery and Ultra-capacitors. Further identification is shown to provide more specificity as needed such as manufacturer and model #. The Serial # provides a unique identifier most suitable to linking the energy storage device to a specific Plug-In hybrid vehicle, class of owners, or class of rate codes. The parameter Rate of Charge Limit kwh/hour shows the maximum rate of energy input as a function of time, such as batteries have significantly slower charge rates than ultra-capacitors. The Present Charge kwh tracks the real-time, to the extent possible, energy storage level in absolute terms (having model type, etc. will provide full capacity, while serial # will provide any level of de-rating to account for age, # of charge cycles, etc. Real-time Rate of Charge depicts the current charge rate, which will be lower than the Rate of Charge Limit. Targeted Storage Requirement depicts the desired energy level which is projected to start at Projected Time of Day Start and which must be completed by Required Time of Day Finish. GPS Location provides real-time physical location of the Plug-In hybrid device, which is used to determine the realistic projection of whether or not the vehicle will either make it back to a specified charging location prior to needing a recharge, or alternatively whether or not the vehicle will be returning to a specified charging location (i.e. a vacation or business trip away from home). The Rate Code/Rank # provides a means to distinguish between different revenue scales (e.g., wholesale, retail, discounted, etc.) and rank provides further differentiation. The Objective Code/Rank # enables differentiation between owners for example wanting to minimize cost, emissions, etc., and again a rank to provide further differentiation.

Referring to FIG. 8, an example of historic energy usage, which is used to project energy requirements in creating the optimal profile is provided. Energy depicts the form of energy required and stored within the Plug-In hybrid vehicle. Date or Holiday provides the ability to specify an absolute date, day of week, an absolute holiday day, or any other means known in the art to track historic performance. Peak Demand depicts the maximum consumption rate with the specified Time of Day Start and Time of Day Finish, while Energy Equivalent depicts the cumulative energy consumption.

Numerous additional parameters are may also be used. In practice, the HyGaSS control system may in fact have significantly more data points than those depicted within FIG. 6 through FIG. 8 and FIG. 13.

FIGS. 9A-9C show a series of embodiments utilizing a high efficiency modified hydraulic energy storage system. A preferred embodiment "charges" the hydraulic energy storage system during off-peak times by utilizing off-peak energy rates for subsequent "expansion" (i.e., power generation) during otherwise peak times. A particularly preferred hydraulic energy storage system utilizes a thermal hydraulic fluid. A specifically preferred thermal hydraulic fluid is at least comprised of two components selected from one absorber and one refrigerant, though the utilization of a binary solution is also possible. The thermal hydraulic fluid is in fluid communication with a heat exchanger as a means of transferring thermal energy into the thermal hydraulic fluid resulting in an increased enthalpy.

FIG. 9A is a depiction of an External Off-peak Energy Source 800, which can range from off-peak electricity, or wind/solar/geothermal driven Thermal Hydraulic Pump 850 to pressurize (i.e., increase the pressure) a working fluid. The resulting high pressure thermal hydraulic fluid is stored into an accumulator providing Thermal Hydraulic High Pressure Storage 990. This scenario has multiple benefits beginning from the arbitrage position of storing off-peak energy for consumption during peak periods, which in many cases off-peak rates can be a fraction of peak rates. Furthermore, and more importantly, peak periods are often associated with peak solar levels which enables solar energy 880 to be utilized to increase the enthalpy of the stored thermal hydraulic fluid.

FIG. 9B illustrates one exemplary scenario where an external heat source, such as Gasoline Combustor 910, is utilized to increase the enthalpy of the thermal hydraulic fluid within the Thermal Hydraulic High Pressure Storage 990 device. Alternative methods include a liquid to liquid Thermal Hydraulic Heat Exchanger 960 post the Thermal Hydraulic High Pressure Storage 990, or even a boiler or furnace. The thermal hydraulic fluid, which now has a higher enthalpy, generates power through an expansion stage in a Thermal Hydraulic Expansion Motor 970. Under the scenario where the thermal hydraulic fluid is reused, the expanded fluid is stored within a Thermal Hydraulic Low Pressure Storage device 980. Alternative scenarios, particularly when the thermal hydraulic fluid is compressed air includes exhausting the expanded fluid to the atmosphere.

FIG. 9C illustrates a binary fluid as the hydraulic fluid comprised of components including ionic liquids/polycarbonates/polymers with a lower critical solution temperature and absorbed $CO_2$. The Binary Fluid High Pressure Energy Storage device 700 stores the binary fluid at high pressures. The binary fluid is desorbed into its two principal components of working fluid and absorbent driven by a Thermal Hydraulic Heat Exchanger 960, which obtains thermal energy preferably from $CO_2$ neutral sources 880. The resulting weak solution, which refers to the absorbent having a relatively lower concentration of working fluid (i.e., $CO_2$), generates power by recovering hydraulic pressure through a Weak. Solution Positive Displacement Engine 710 that can be a range of devices from gerotors, bent-axis pumps, piston pumps and other positive displacement pumps. The resulting desorbed working fluid Desorbed $CO_2$ 720 is subsequently heated by Thermal Hydraulic Heat Exchanger 730 to increase the enthalpy. Power is generated by subsequently expanding the thermal hydraulic fluid in a Thermal Hydraulic Expansion Motor 970, which can include devices from gerotors, bent-axis pumps, piston pumps and traditional expansion devices (i.e., turbine). The expanded fluid is then stored within a Thermal Hydraulic Low Pressure Storage device 980.

Figure 10:
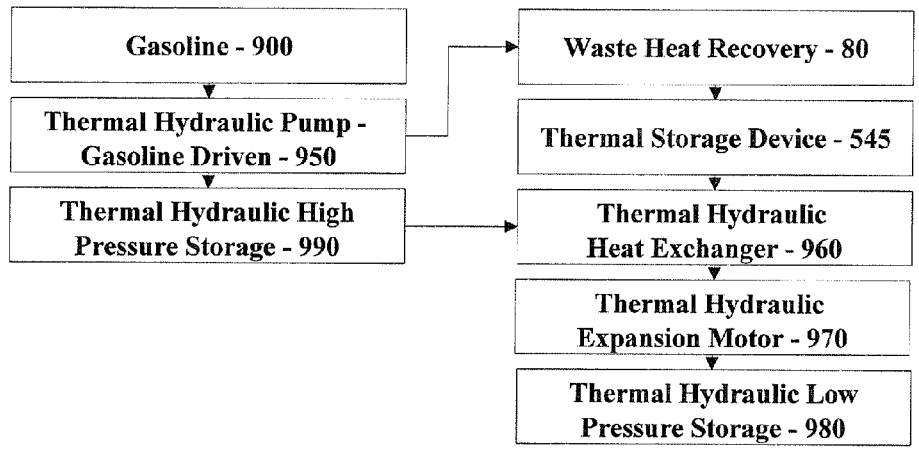
FIG. 10 is a schematic illustration of a thermal hydraulic engine with integral thermal energy recovery.

FIG. 10 illustrates another embodiment that utilizes an engine to drive directly a pump to increase the pressure of thermal hydraulic fluid. The preferred engine is driven by the category of alternative energy sources, which include solar, geothermal, wind, tidal, and biomass combustion. A particularly preferred alternative energy source yields waste heat. The resulting waste heat can be utilized immediately to increase the enthalpy of the thermal hydraulic fluid or stored in a thermal energy storage device for subsequent and/or on demand energy production. One exemplary scenario is the use of an external fuel source including Gasoline 900, which is preferably derived from biomass such as ethanol/butanol/biodiesel, to drive a Thermal Hydraulic Pump Gasoline Driven 950. The thermal hydraulic pump is preferably an external combustion engine that directly drives a hydraulic pump. The direct drive hydraulic pump is more efficient than a direct drive electricity generator or transmission due to Waste Heat Recovery device 80 that as noted earlier increases the enthalpy of the thermal hydraulic fluid. The thermal energy can be optionally stored within a Thermal Storage Device 545 in the event that power consumption is an asynchronous process with power generation. This stored thermal energy is utilized to increase the enthalpy through a Thermal Hydraulic Heat Exchanger 960. Power is generated by subsequently expanding the thermal hydraulic fluid in a Thermal Hydraulic Expansion Motor 970. The expanded fluid is then stored within a Thermal Hydraulic Low Pressure Storage device 980.

Figure 11:
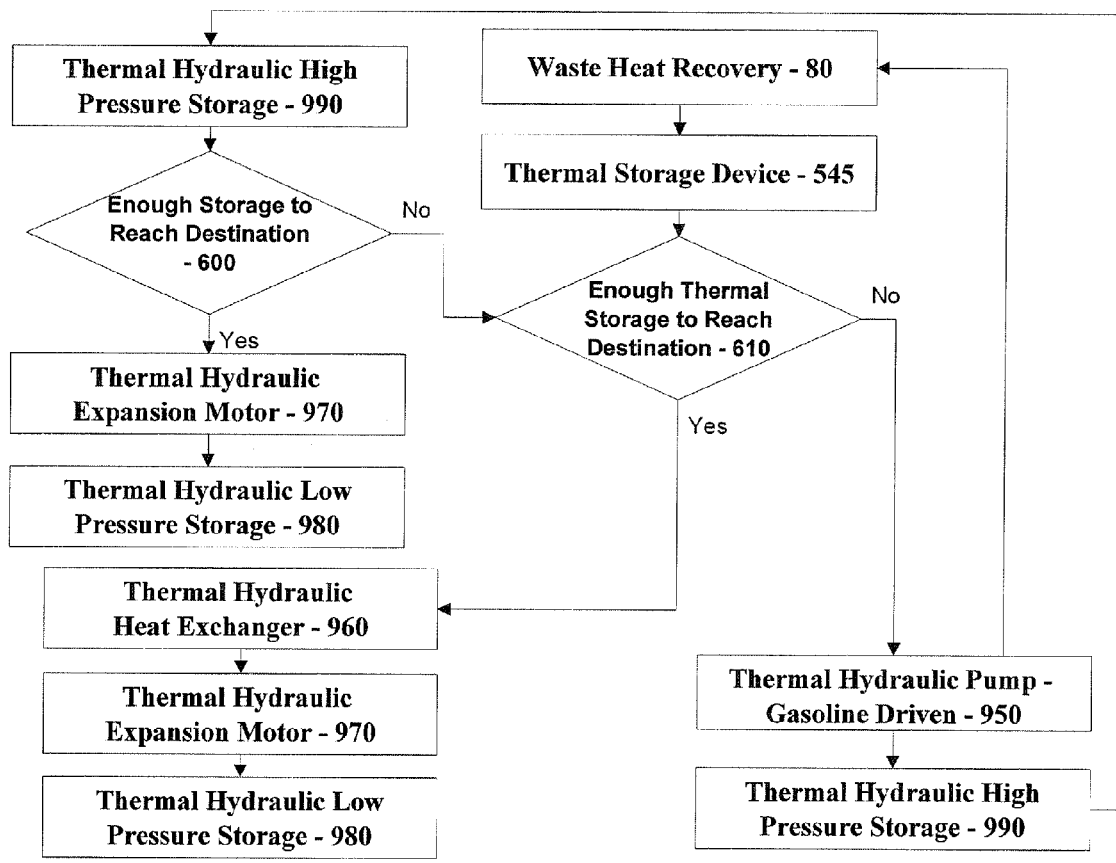
FIG. 11 is a flow chart of a control method to maximize total energy efficiency.

FIG. 11 is a flow chart for controlling the discharge of the high pressure (i.e., charged) thermal hydraulic fluid to achieve maximum total energy efficiency. Additional anticipated goals include minimizing total $CO_2$ emissions that takes into account all energy sources utilized to charge the thermal hydraulic fluid. For example, a biofuel driven thermal hydraulic engine is the primary engine and includes $CO_2$ emissions from combustion of biofuel, whereas a wind driven turbine has zero emissions for that first stage. Maximizing total energy efficiency is achieved by ensuring that the expansion of the thermal hydraulic fluid occurs at a rate determined to achieve enthalpy gain by heat transfer into the working fluid from waste heat sources accounting for the energy efficiency of primary engine, the known/calculated energy efficiency of thermal hydraulic engine, and the known/calculated energy consumption until next thermal hydraulic charging. A key enabler of this method is obtaining the precise destination from a range of inputs including user's electronic calendar keyboard entry within transportation device, routing in global positioning system, or even historical data for either transportation device driver or the transportation device itself. Maximizing total energy efficiency also includes at least one parameter for tracking the thermal hydraulic fluid accumulator capacity. Preferably, one overriding goal is to ensure adequate spare capacity within the accumulator to charge from regenerative braking, in other words traditional thermal hydraulic hybrid systems. A simple decision tree can determine if ample stored energy exists Enough Storage to Reach Destination 600 within the Thermal Hydraulic High Pressure Storage 990. And when adequate thermal energy is available to reach the desired destination Enough Thermal Storage to Reach Destination 610, assuming that stored energy is obtained by off-peak energy consumption, power is generated by direct expansion of the thermal hydraulic fluid in the Thermal Hydraulic Expansion Motor 970. The expanded fluid is then stored within a Thermal Hydraulic Low Pressure Storage device 980. When inadequate stored energy exists at the existing enthalpy values and adequate supply of thermal energy is available, assuming the thermal energy is at a temperature above the thermal hydraulic fluid, the thermal hydraulic fluid enthalpy is increased by utilizing the stored thermal energy in Thermal Storage Device 545 through the Thermal Hydraulic Heat Exchanger 960 and then again power is generated by subsequently expanding the thermal hydraulic fluid in a Thermal Hydraulic Expansion Motor 970. The expanded fluid is then stored within a Thermal Hydraulic Low Pressure Storage device 980. When both an inadequate amount of stored energy in the combination form of hydraulic and thermal energy is available to reach the destination an externally fired Thermal Hydraulic Pump—Gasoline Driven 950 creates additional power that is either immediately used or preferably stored within the Thermal Hydraulic High Pressure Storage 990 and the byproduct waste heat is recovered by a Waste Heat Recovery device 80.

Figure 12:
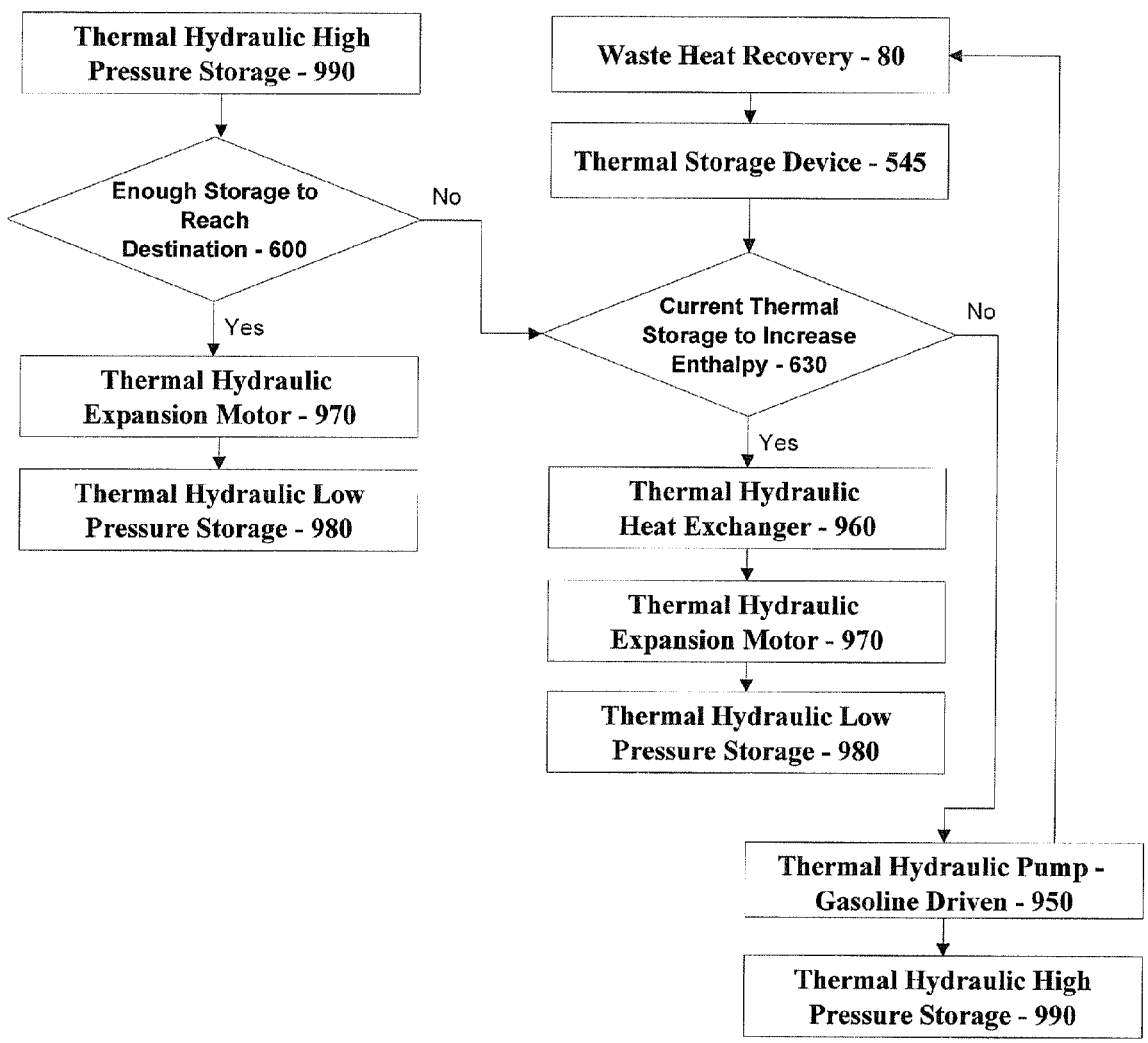
FIG. 12 is a flow chart of a control method to minimize total energy operating cost.

FIG. 12 is a flow chart depicting controlling the discharge of the high pressure thermal hydraulic fluid to achieve minimum operating costs. One exemplary application is charging the thermal hydraulic system at night using off-peak energy, which is traditionally a fraction of the cost of peak energy and/or virtually all fuel sources. A preferred embodiment has multiple decision trees with one exemplary being where the energy stored within the thermal hydraulic accumulator is inadequate to reach the destination without any use of primary engine of transportation device. Under such a scenario, the discharge of the thermal hydraulic fluid will only occur when thermal energy is stored or available to increase the enthalpy of the thermal hydraulic fluid. Another example is where the energy stored within the thermal hydraulic accumulator is sufficient to reach the destination. Under this scenario the discharge rate is determined to achieve maximum accumulator drawdown, assuming that the operating costs of the thermal hydraulic energy are significantly lower than the primary engine with or without the additional efficiency gain achieved from the thermal energy storage. Another simple decision tree determines if ample stored energy exists Enough Storage to Reach Destination 600 within the Thermal Hydraulic High Pressure Storage 990. When thermal energy is available to Current Thermal Storage to Increase Enthalpy 630 power is generated by direct expansion of the thermal hydraulic fluid in the Thermal Hydraulic Expansion Motor 970. The expanded fluid is then stored within a Thermal Hydraulic Low Pressure Storage device 980. When inadequate stored energy exists at the existing enthalpy values and adequate supply of thermal energy is available, assuming the thermal energy is at a temperature above the thermal hydraulic fluid, the thermal hydraulic fluid enthalpy is increased by utilizing the stored thermal energy in Thermal Storage Device 545 through the Thermal Hydraulic Heat Exchanger 960 and then again power is generated by subsequently expanding the thermal hydraulic fluid in a Thermal Hydraulic Expansion Motor 970. The expanded fluid is then stored within a Thermal Hydraulic Low Pressure Storage device 980. When both an inadequate amount of stored energy in the combination form of hydraulic and thermal energy is available to reach the destination an externally fired Thermal Hydraulic Pump—Gasoline Driven 950 creates additional power that is either immediately used or preferably stored within the Thermal Hydraulic High Pressure Storage 990 and the byproduct waste heat is recovered by a Waste Heat Recovery device 80.

Various embodiments may utilize a range of representative parameters and typical values for the parameters. These parameters include the following with their respective definitions:

Thermal hydraulic fluid energy cost per kg which is the average cost per kg paid for obtaining the thermal hydraulic fluid in its charged state;

Thermal hydraulic fluid energy replacement cost per kg which is the anticipated cost per kg to charge the fluid;

Thermal hydraulic fluid energy gain in enthalpy represented by either thermodynamic equations of state or a non-linear equation as a function of temperature and pressure;

Thermal hydraulic fluid accumulator capacity;

Thermal hydraulic fluid accumulator charge level;

Primary engine thermal energy source temperature;

Primary engine fuel cost per kW which is the average cost per kW paid for obtaining the fuel;

Transportation device regenerative energy gain represented by either force/mass or non-linear equation as a function of velocity and deceleration rate;

Transportation device acceleration energy gain represented by either force/mass or non-linear equation as a function of velocity and acceleration rate; and Primary engine fuel replacement cost per kW which is the anticipated cost per kW to fill up the fuel tank.

Real time sensors are utilized to monitor pressure, temperature, accumulator level, fuel level, energy production of expander, transportation device velocity, transportation device location, and estimated transportation device mass.

Figure 13A:
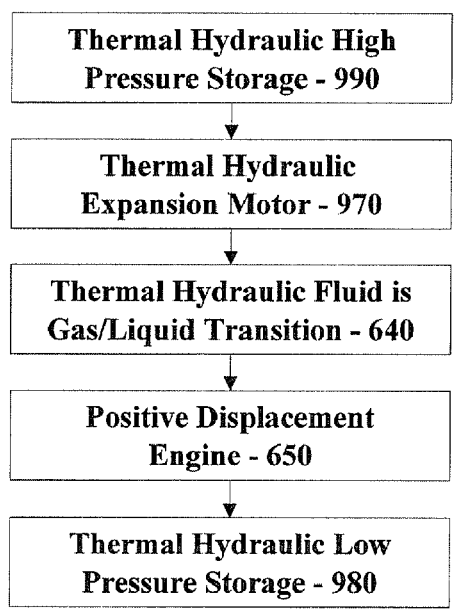
FIGS. 13A and 13B are schematic diagrams illustrating a dual expansion stage thermal hydraulic energy conversion device.

Referring to FIG. 13A, a method of controlling the discharge rate of the pressurized working fluid into a minimum of two stages is illustrated. A preferred first stage discharge pressure from the Thermal Hydraulic High Pressure Storage 990 and temperature occurs within the desorption range of a working fluid and a gas is expanded within a Thermal Hydraulic Expansion Motor 970. A preferred second stage discharge pressure and temperature occurs prior to the phase transition of the gas from second to third stage into a liquid Thermal Hydraulic Fluid is Gas/Liquid Transition 640. Additional energy is extracted by expanding the working fluid to a liquid within a Positive Displacement Engine 650. The expanded working fluid is then stored within Thermal Hydraulic Low Pressure Storage 980.

Figure 13B:
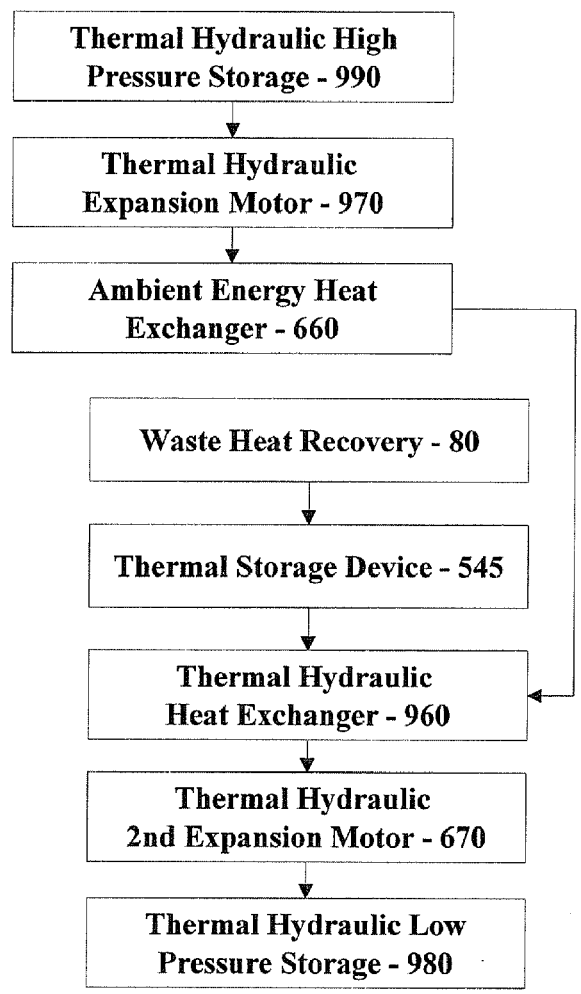

Referring to FIG. 13B, a particularly preferred embodiment is illustrated that utilizes ambient energy to increase the enthalpy of the thermal hydraulic fluid in the same manner as a traditional heat pump utilizes ambient energy to achieve a coefficient of performance greater than unity (i.e., 1). This ambient energy becomes a "free" energy source, however, as in any thermodynamic cycle, this ambient energy is only available when the temperature of the working fluid is below the ambient temperature. This is achieved by utilizing a dual stage expansion by utilizing the prior pressurized thermal hydraulic fluid from Thermal Hydraulic High Pressure Storage 990. The first stage of expansion energy is transformed to mechanical energy by a Thermal Hydraulic Expansion Motor 970. The starting temperature of the high pressure thermal hydraulic fluid is preferably at a sufficiently low temperature such that isentropic (or approximately) yields a fluid temperature sufficiently below ambient temperature (just like an air conditioning or refrigeration unit), with this cooling capacity ideally utilized as an additional method to decrease energy consumption. The ambient energy is transferred into the thermal hydraulic fluid by an Ambient Energy Heat Exchanger 660. Additional energy is transferred into the thermal hydraulic fluid by higher temperature thermal energy recovered by Waste Heat Recovery 80 either directly or stored within Thermal Storage Device 545 via Thermal Hydraulic Heat Exchanger 960. The now higher enthalpy thermal hydraulic fluid is further expanded to generate power through Thermal Hydraulic 2nd Expansion Motor 670 with the subsequent expanded fluid stored within Thermal Hydraulic Low Pressure Storage 980.

One embodiment is an energy production system comprising at least two distinct expansion stages including a first expansion stage resulting in a thermal hydraulic fluid temperature lower than a current ambient temperature, a subsequent heating process to increase the enthalpy of the thermal hydraulic fluid, and a second expansion stage resulting in a system coefficient of performance greater than unity.

The energy production system is preferably comprised of a binary fluid consisting of at least one absorbent and at least one absorbate. A preferred method to desorb the absorbate from the absorbent is by at least one non-thermal method including, for example, magnetic refrigeration, vapor compression heat pump condenser, solar activated direct spectrum light absorption, electrodialysis, electrostatic fields, membrane separation, electrodesorption, pervaporation, gas centrifuge, vortex tube CO2-liquid absorber, decanting, or combinations thereof. A particularly preferred energy to desorb the absorbate is from off-peak electricity, stored electricity, or combinations thereof.

Figure 14:
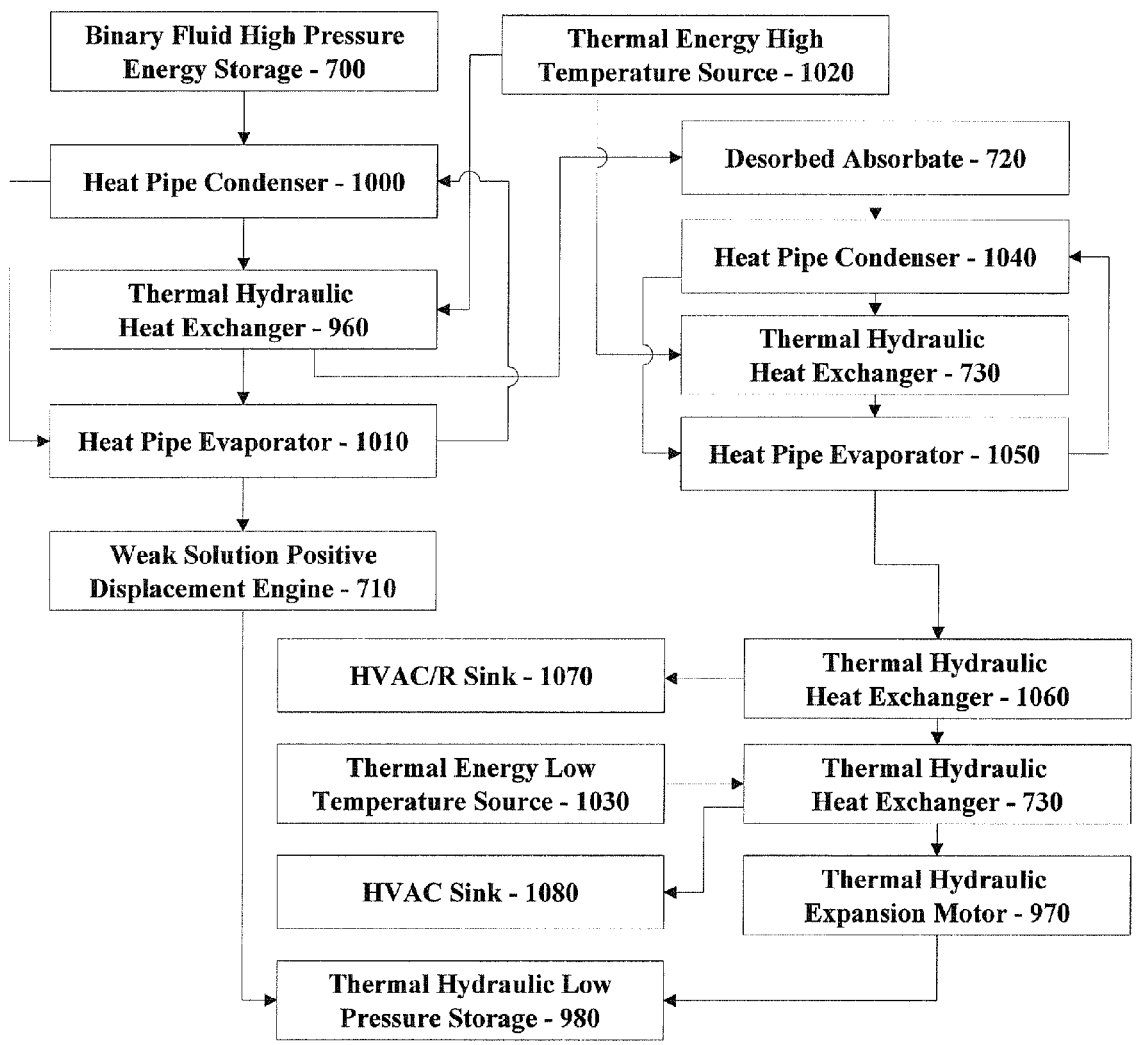
FIG. 14 is a schematic diagram illustrating a dual expansion stage thermal hydraulic energy conversion device with integrated heat pipes.

FIG. 14 illustrates another embodiment of the energy production system that stores the thermal hydraulic fluid (a binary fluid) in a Binary Fluid High Pressure Energy Storage device 700. The binary fluid is then desorbed by utilizing traditional thermal methods by being in fluid communication with Thermal Hydraulic Heat Exchanger 960 from Thermal Energy High Temperature Source 1020 (which is also used to drive heat pipe around absorbate through Thermal Hydraulic Heat Exchanger 730) into the thermal hydraulic fluid Desorbed Absorbate 720 and absorbent, such that the temperature of the thermal energy source is above the bubbling point with a significant (at least 80%) portion of both the weak solution being recovered by Heat Pipe Evaporator 1010 to Heat Pipe Condenser 1000 and the absorbate thermal energy being recovered by Heat Pipe Evaporator 1050 to Heat Pipe Condenser 1040, or combinations thereof prior to generating power through the hydraulic energy of absorbent by Weak Solution Positive Displacement Engine 710, expansion energy or hydraulic energy of absorbate by Thermal Hydraulic Expansion Motor 970, or combinations thereof. The expanded weak solution and absorbate are ultimately discharged into the Thermal Hydraulic Low Pressure Storage 980 device, to provide the additional benefit of buffering the system in addition to enabling asynchronous energy generation and subsequent absorption. This is a preferred method because it minimizes the required thermal energy from the higher quality thermal source. Enthalpy of the absorbate is further increased by lower quality thermal sources such as providing refrigeration by HVAC/R Sink 1070 in fluid communication with Thermal Hydraulic Heat Exchanger 1060, Thermal Energy Low Temperature Source 1030 and/or HVAC Sink 1080 in fluid communication with Thermal Hydraulic Heat Exchanger 730. This is particularly preferable for example in solar thermal applications where higher temperatures often require more capital intensive solar collectors that are tracking concentrators. The use of standard non-tracking collectors provide the balance of thermal energy at a lower cost per kW. One superior method as known in the art for recovering thermal energy, though typically for dehumidification purposes are a series of heat exchanger devices surrounding a heat exchanger that transfers thermal energy from the high quality source into the binary thermal hydraulic fluid, is the use of heat pipes. Other methods include rotating heat exchanger wheels.

Figure 17A:
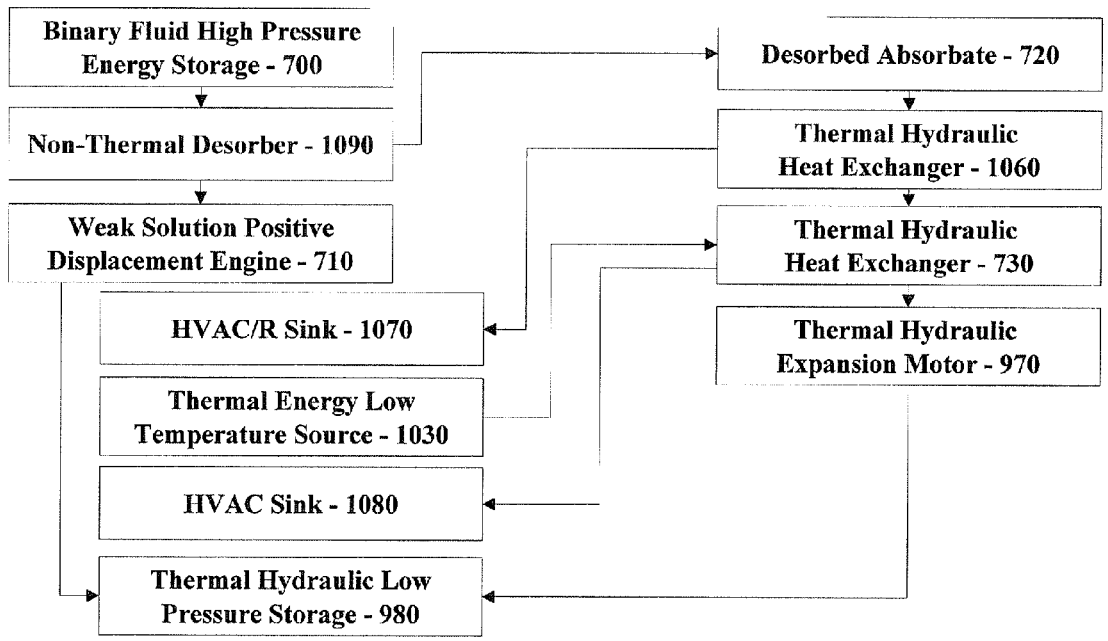
FIGS. 17A and 17B are schematics of a dual expansion stage thermal hydraulic energy conversion device with two exemplary non-thermal desorption processes.

Yet another embodiment is referenced in FIG. 17A, which has the advantage of increasing the net total efficiency and reducing the cost per kW by arbitraging between off-peak and peak energy rates by Desorbing Absorbate 720 from the strong solution during off-peak hours. A particularly preferred example is the use of Non-Thermal Desorber 1090 such as electrodesorption during off-peak hours. Electrodesorption energy is often significantly lower than thermal desorption energy, which when further combined with off-peak energy rates often being significantly lower than peak-energy rates, yields a net cost per kilogram desorbed often as low as 10% of the otherwise peak-energy cost per kilogram. The further utilization of a Binary Fluid High Pressure Energy Storage 700 to store the desorbed absorbate enables this stored energy to be utilized during peak periods by expanding the weak solution in the Weak Solution Positive Displacement Engine 710 and desorbed absorbate with an increase in enthalpy by HVAC/R Sink 1070 in fluid communication with Thermal Hydraulic Heat Exchanger 1060, Thermal Energy Low Temperature Source 1030 and/or HVAC Sink 1080 in fluid communication with Thermal Hydraulic Heat Exchanger 730 is expanded through a Thermal Hydraulic Expansion Motor 970. The expanded fluid is then stored either within a Thermal Hydraulic Low Pressure Storage 980 that stores the now recombined absorber and absorbent, or alternatively stores only the expanded absorbate to minimize the amount of absorbent required. Another advantage of this method is the often higher day-time (coincides most often with peak hours) temperatures as compared to night-time temperatures, with the further advantage that the expansion of the absorbate provides significant cooling that further offsets electricity consumption required by HVAC/R equipment.

Figure 17B:
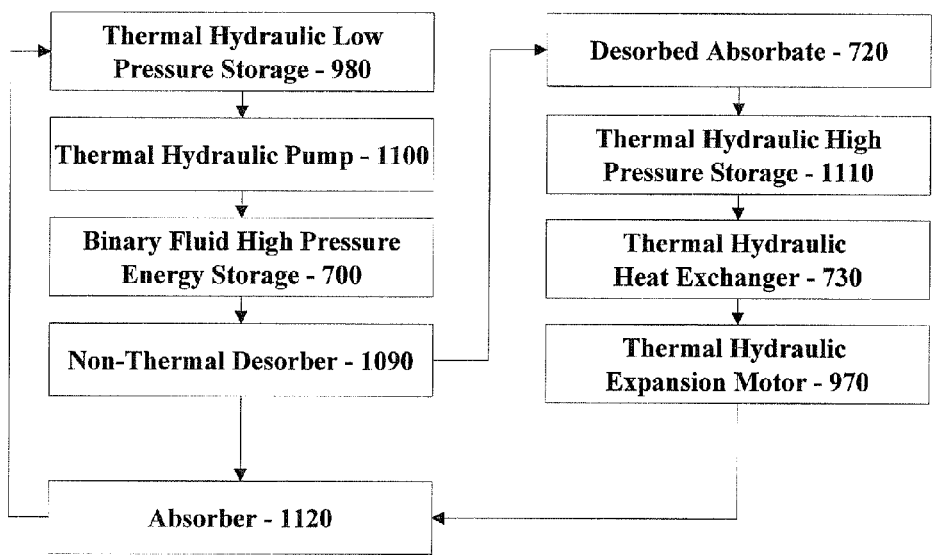

FIG. 17B illustrates another embodiment that leverages off-peak shift of energy consumption and peak-energy production. This embodiment utilizes a Thermal Hydraulic Low Pressure Storage 980 that has "spent" absorbate absorbed into the weak solution (not shown in the figure is the rejection of heat of absorption) that is pressurized by a Thermal Hydraulic Pump 1100 into a Binary Fluid High Pressure Energy Storage 700 during off-peak hours. The binary fluid is fractionated into the weak solution, which is reused for absorbing the above noted absorbate in Absorber 1120, and Desorber Absorbate 720 by Non-Thermal Desorber 1090 methods. The now high pressure absorbate is stored in Thermal Hydraulic High Pressure Storage 1110. During peak operations, the enthalpy of the stored absorbate is increased by being in fluid communication with a Thermal Hydraulic Heat Exchanger 730 and then subsequently expanded by a Thermal Hydraulic Expansion Motor 970.

Figure 21:
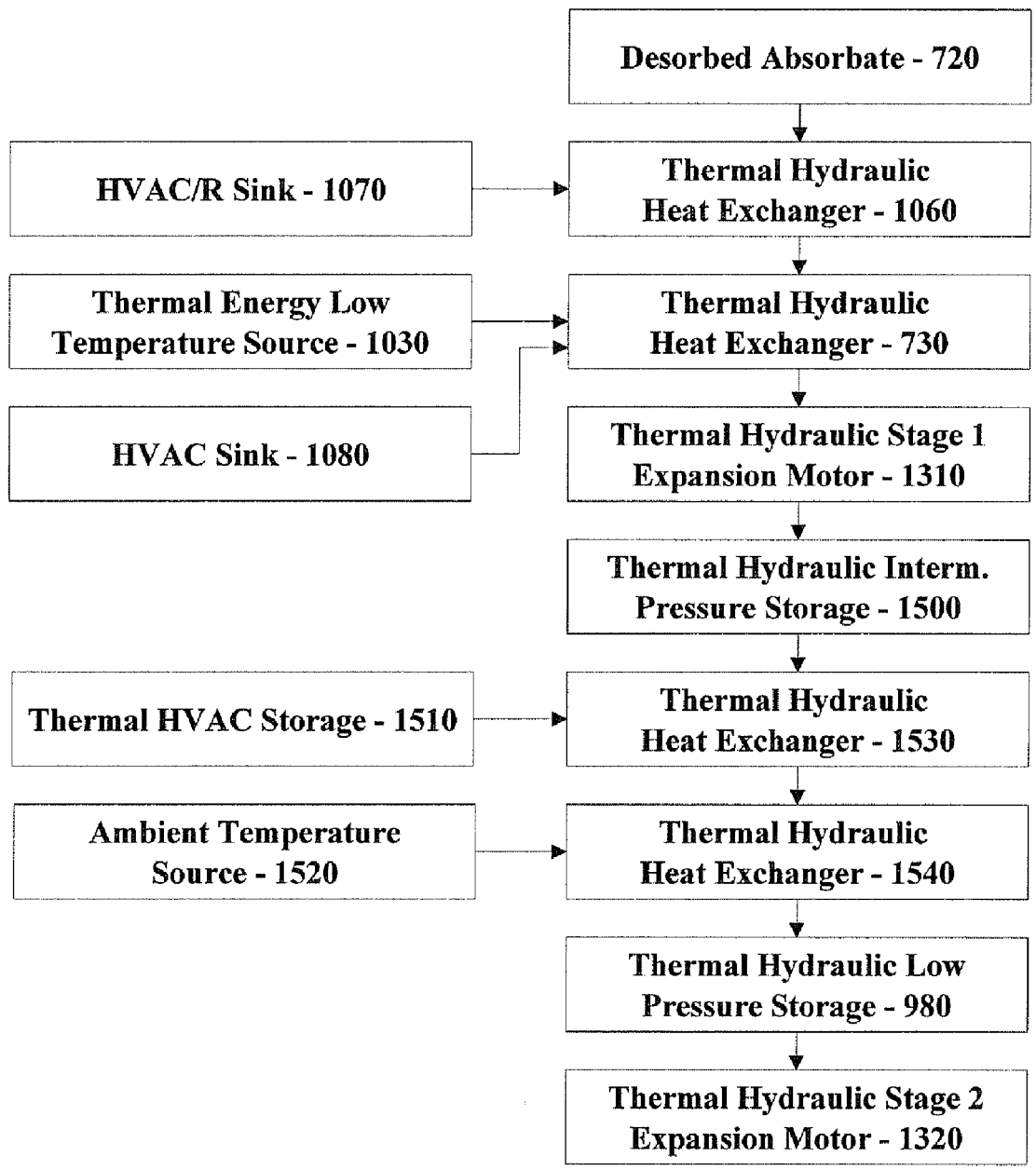
FIG. 21 is a schematic diagram depicting a dual stage expansion stage energy conversion process with sub-ambient temperatures between the two stages.

Another particularly preferred embodiment shown in FIG. 21 is the energy production system where the Desorbed Absorbate 720 is expanded in at least two distinct expansion stages including a first expansion stage into a Thermal Hydraulic Stage 1 Expansion Motor 1310 resulting in a thermal hydraulic fluid temperature lower than a current ambient temperature, a subsequent heating process to increase the enthalpy of the thermal hydraulic fluid including by HVAC/R Sink 1070 in fluid communication with Thermal Hydraulic Heat Exchanger 1060, Thermal Energy Low Temperature Source 1030 and/or HVAC Sink 1080 in fluid communication with Thermal Hydraulic Heat Exchanger 730 and optionally stored in a Thermal Hydraulic Intermediate Pressure Storage 1500 to decouple the first stage expansion and the second stage expansion, and a second expansion stage that has the post first stage discharged absorbate has its enthalpy increased first by providing cooling that is stored (or instantaneously used) in a Thermal HVAC Storage 1510 tank in fluid communication with Thermal Hydraulic Heat Exchanger 1530 and then subsequently Ambient Temperature Source 1520 in fluid communication with another Thermal Hydraulic Heat Exchanger 1540 resulting in a system coefficient of performance greater than unity. The now higher enthalpy absorbate is optionally stored in the Thermal Hydraulic Low Pressure Storage 980, which low pressure is relative to the first stage, to again decouple the cooling from the power generation. It is well known in the art of heat pumps that a traditional non-absorption heat pump (i.e., vapor compression) has a coefficient of performance greater than one and in many cases as high as 4 to 6. A specifically preferred embodiment partially expands the absorbate while capturing the energy of expansion to drive a thermal hydraulic motor 1310 such that the starting pressure and temperature are set with a particular pressure reduction obtained where the discharge temperature after the first expansion stage is lower than the current ambient temperature. This operating mode enables free energy, meaning for example the thermal energy can be obtained without any solar collectors in order to increase the enthalpy of the partially expanded absorbate prior to the second expansion stage. The second expansion stage is also comprised of a thermal hydraulic fluid expansion motor and yields therefore more net energy than the initial energy required to raise the pressure by a hydraulic pump to the higher initial pressure, $P0$. This particular example clearly demonstrates the advantage of a coefficient of performance being greater than unity, and thus the fundamental advantage of using a thermal hydraulic fluid as compared to a standard hydraulic fluid as an energy storage medium.

Referring to FIG. 16 is one exemplary thermodynamic cycle showing actual National Institute of Standards and Technology "NIST" in United States of America data for carbon dioxide at the four state points of pre first expansion stage, post first expansion stage, pre second expansion stage, and post second expansion stage. Additional data is from a spreadsheet calculating isentropic temperatures for the above pressure expansion ratios.

A particularly preferred thermal hydraulic fluid is comprised of at least one absorbent having partial miscibility with an absorbate wherein the absorbent has a lower critical solution temperature "LCST" and at least one absorbate wherein the absorbate is desorbed as a supercritical fluid. The advantage of such a thermal hydraulic fluid is a coefficient of performance significantly higher than 1 and often between 2 through 20. Exemplary absorbents that exhibit a "LCST" include by way of illustration and not limitation, petroleum based polymers including acrylamides such as poly(N-isopropyl acrylamide) and poly(N-acryloly-I-valine) and esters such as poly(methylmethacryalic acid) and with larger aliphatic esters, e.g., ethyl, propyl, isopropyl, and with aromatic esters.

Figure 18:
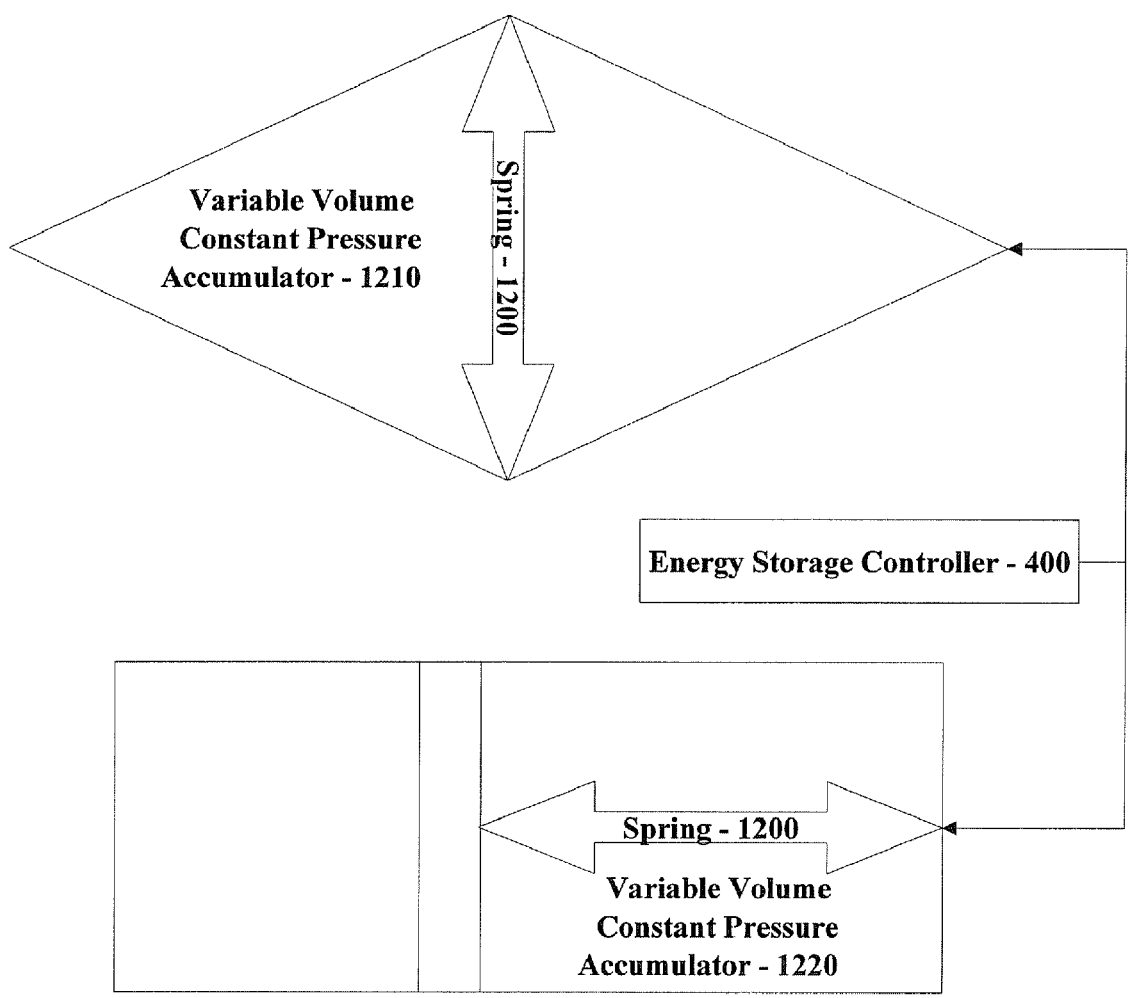
FIG. 18 is a schematic diagram depicting a variable volume constant pressure accumulator.

FIG. 18 illustrates the further addition of at least one Variable Volume Constant Pressure Accumulator 1210 that utilizes a constant pressure load balancer (i.e., a spring 1200). The constant pressure load balancer force has a resistive force at least approximately 85% of the hydraulic fluid force on the interior surface of the variable volume accumulator. The Variable Volume Constant Pressure Accumulator 1210 as compared to a standard accumulator yields many advantages including higher actual energy storage per unit volume, and more constant accumulator operating pressure enabling the entire energy storage system to operate at a more steady state equilibrium. The yet further addition of an Energy Storage Controller 400 that varies the expansion discharge pressure dynamically to remain within about 10% of the relatively low-pressure accumulator Variable Volume Constant Pressure Accumulator 1220 enables the maximum amount of energy to be extracted.

Figure 15:
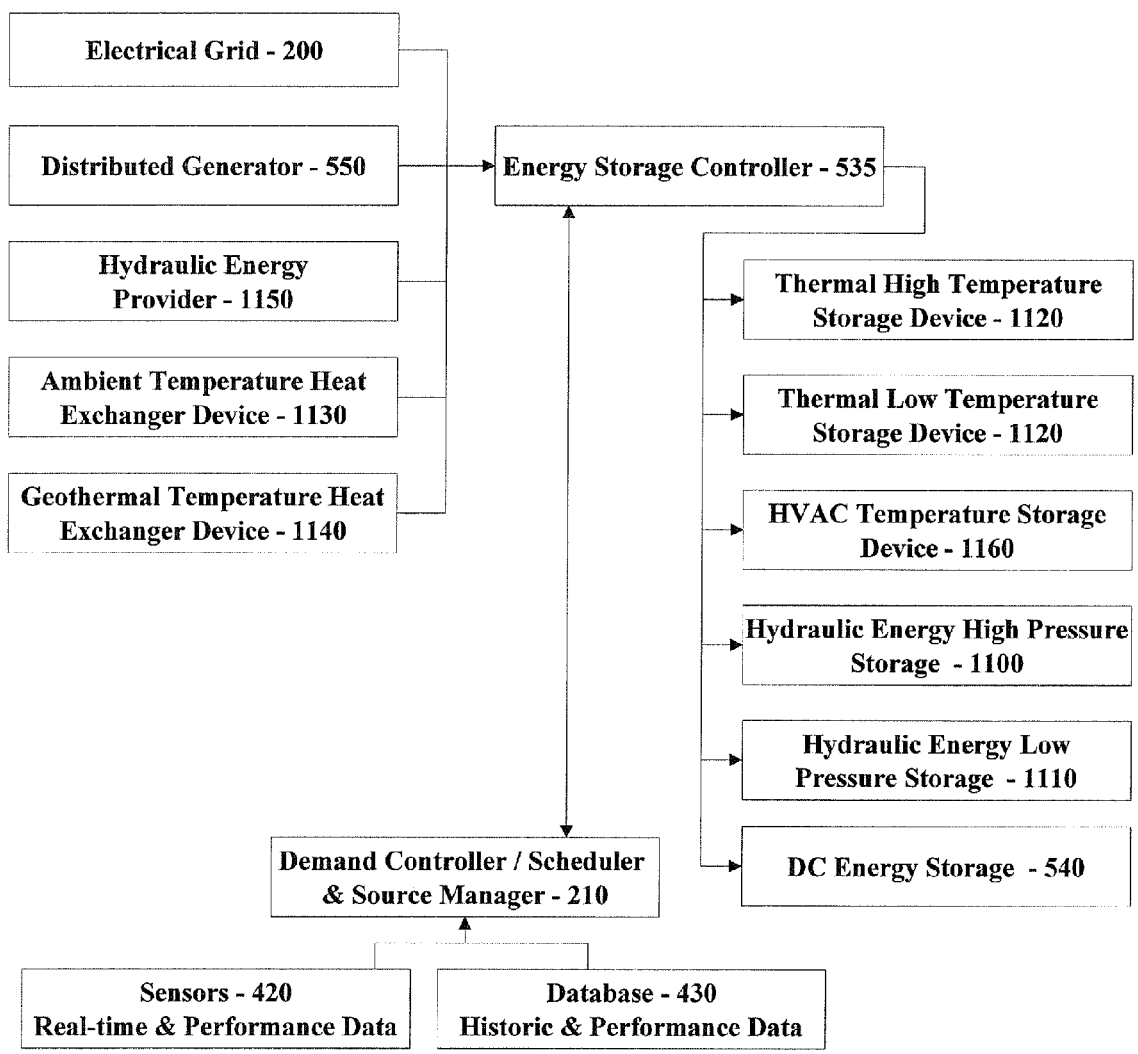
FIG. 15 is a schematic diagram depicting an energy storage controller and a network of energy producers, energy consumers, thermal producers, and thermal consumers.

FIG. 15 illustrates another embodiment of the energy storage system comprised of an Energy Storage Controller 535, energy demand controller Demand Controller/Scheduler & Source Manager 210, and thermal hydraulic fluid wherein the Energy Storage Controller 535 modulates a mass flow rate into a thermal hydraulic pump Hydraulic Energy Provider 1150 and out of thermal hydraulic storage Hydraulic Energy High Pressure Storage 1100 to output a constant net output energy production accounting for at least one energy parameter selected from the group consisting of Electrical Grid 200 supply and demand, distributed energy supply Distributed Generator 550 and demand, and energy storage supply. The use of traditional electrical energy storage devices (e.g., DC Energy Storage 540), such as flywheels and batteries, and traditional hydraulic storage devices Hydraulic Energy High Pressure Storage 1100 (e.g., hydraulic accumulator) is well known for enabling power generation to be asynchronous from power consumption, however all of these methods have a coefficient of performance less than unity. In other words the process of converting electricity into the alternate energy storage form and then converting back into electricity yields significant conversion losses. A fundamental advantage of the thermal hydraulic fluid is such that low quality thermal energy sources are able to overcome the conversion losses in its entirety. The integration of Ambient Temperature Heat Exchanger Device 1130, Geothermal Temperature Heat Exchanger Device 1140, Thermal Low Temperature Storage Device 1120, and HVAC Temperature Storage Device 1160 are representative thermal sources in fluid communication with the thermal hydraulic fluid to increase it's enthalpy. The Energy Storage Controller 535 utilizes a combination of Sensors 420 with real-time operating and performance data, and a Database 430 having historic operating and performance data to maximize net energy efficiency. One of the most important operating scenarios where the thermal hydraulic energy storage system provides significant advantage is in solar power plants. One exemplary is in solar photovoltaic power plants where the energy produced is instantaneously disrupted resulting from even intermittent cloud coverage. This non-constant energy output limits the power plant to never becoming a base power plant, which limits the economic value of the power plant. One advantage of this embodiment is that solar concentrated photovoltaic power plants, which are adversely impacted by higher photovoltaic cell operating temperatures created by the balance of solar energy not converted into electricity, have higher conversion efficiencies when integrated into the dual stage expansion cycle due to the active cooling to below ambient temperature. The dual stage expansion cycle reduces the operating temperature of the photovoltaic cells by a minimum of about 5 degrees Fahrenheit up to a maximum of about 200 degrees Fahrenheit. The dual stage expansion cycle has the further advantage of transforming the balance of solar energy not converted by the photovoltaic cells, which ends up as waste heat, into thermal energy in order to increase the enthalpy of the thermal hydraulic fluid. Another important advantage is the combined system has a more constant and predictable energy production output by utilizing the stored thermal energy and hydraulic energy. Other exemplary scenarios include the utilization of the dual stage expansion cycle to stabilize the net production of energy by accounting for the real-time production fluctuations of energy production from wind turbines, wave energy, and geothermal or solar thermal driven thermodynamic cycles. Additional exemplary scenarios include non-alternative energy sources such as a combustion engine mechanically connected to a thermal hydraulic pump generating hydraulic energy having power W1 in a pressurized thermal hydraulic fluid, a waste heat recovery heat exchanger in fluid communication with the combustion engine exhaust, engine oil cooler, or combinations thereof to transfer thermal energy into the pressurized thermal hydraulic fluid, and a thermal hydraulic motor generating energy having power W2 wherein power W2 is greater than power W1. The dual stage expansion cycle is best characterized as an energy storage system comprised of a thermal hydraulic fluid, thermal hydraulic pressure storage system having a pressure P1, a thermal hydraulic pressure storage system having a pressure P2, a thermal hydraulic pump, a thermal hydraulic motor, and a heat exchanger in fluid communication with the thermal hydraulic fluid prior to the thermal hydraulic motor wherein pressure P1 is at least about 15% greater than pressure P2. A particularly preferred embodiment utilizes a thermal hydraulic fluid that is a binary fluid comprised of an absorbent and absorbate, wherein the absorbent and absorbate are desorbed, wherein the desorbed absorbate is further heated by a thermal energy source, wherein the desorbed absorbate generates power by reducing the pressure to P2, wherein pressure P2 is lower than pressure P1, wherein the absorbent is at a pressure P1, wherein the absorbent generates power by reducing the pressure to P3, wherein pressure P1 is greater than pressure P3, and wherein pressure P2 is greater than pressure P3. The operation of this dual stage expansion cycle, particularly when the expansion would yield an absorbent temperature that yields an unacceptably high viscosity or worse a solid, thus in order to maximize the energy production it is necessary to limit the expansion of the absorbent to a higher pressure than the expansion of the absorbate. The further utilization of a thermal storage device enables the power generating operation to be asynchronous by transferring the thermal energy into the thermal hydraulic fluid by being in fluid communication with the thermal storage device. One exemplary scenario is the combination of the thermal hydraulic energy production system with any traditional thermodynamic cycle where the bottom cycle waste energy is stored and then utilized to increase the enthalpy of the thermal hydraulic fluid.

Another method to achieve asynchronous power generation, power consumption, and thermal production is a thermal hydraulic motor connected to an electricity generator and a electricity storage device wherein the energy storage controller regulates mass flow out of the thermal hydraulic energy storage device and electrical flow into the electricity storage device to minimize energy consumption by reducing net electricity consumption. The thermal energy resulting as a byproduct of the power generation, and also waste heat resulting from the charging of the electricity storage device is recovered by the thermal hydraulic fluid while providing cooling of the electricity storage device. The thermal hydraulic fluid is expanded while concurrently utilizing the thermal hydraulic motor to convert the first expansion stage energy into electricity.

A further embodiment of the asynchronous power production and power consumption process is achieved by utilizing the energy storage controller with a thermal hydraulic motor connected to a electricity generator and a thermal hydraulic energy storage device to regulate the mass flow into the thermal hydraulic energy storage device to maximize electricity production efficiency from electrical sources including the electrical grid, electrical storage, and distributed energy and thermal sources including solar thermal, active cooling of solar photovoltaic, geothermal, thermal storage, and waste heat recovery by utilizing the thermal source to increase enthalpy of the thermal hydraulic fluid subsequently during second stage expansion while concurrently utilizing excess real-time capacity available electricity from the electrical grid and distributed energy. A particularly preferred embodiment has the thermal hydraulic energy storage devices operating as distributed energy devices as the subsequent expansion yields cooling, which in many cases is the primary electricity user creating the significant daily fluctuations of peak power requirement (i.e., cooling degree days occurring during the summer). A particularly preferred embodiment utilizes network communication to coordinate precisely the actual times at which the thermal hydraulic energy storage device is "charged".

Another embodiment of the dual stage expansion cycle is controlled to maximize the net energy produced wherein the net energy produced is the cumulative energy generated by the addition of energy generated from the first expansion stage and the second expansion stage minus the avoided energy required by the operation of traditional cooling systems such as a vapor compressor within an air conditioning, refrigeration, or combinations thereof. The further integration of heat exchangers in the sequence of refrigeration heat exchanger, air conditioning heat exchanger, to waste heat recovery heat exchanger prior to the second expansion stage concurrently provides cooling in the form of refrigeration and/or air conditioning while increasing the enthalpy of the thermal hydraulic fluid to increase the energy produced in the second expansion stage. Producing energy is not always synchronous with the utilization of cooling, thus the further integration of a thermal storage device enables the energy storage controller to regulate mass flow out of the thermal hydraulic energy storage device and mass flow into the thermal storage device in order to maximize net energy efficiency by increasing thermal hydraulic fluid enthalpy prior to second expansion stage and by increasing available cooling after the first expansion stage in an asynchronous process.

The further integration of an energy storage controller control the thermal hydraulic fluid expansion by monitoring in real-time the thermal hydraulic storage device having the thermal hydraulic fluid with a stored energy KWH1 and thermal storage device with stored energy KWH2. The thermal energy stored with the thermal storage device is selected from the group consisting of a thermal energy source, a combustion engine, and a waste heat recovery system recovering thermal energy from the combustion engine.

A preferred embodiment energy storage controller regulates the (a) thermal hydraulic fluid mass flow out of the thermal hydraulic storage device and (b) the thermal hydraulic fluid mass flow into at least one thermal energy source selected from the group consisting of the thermal energy storage and the waste heat recovery system. The particularly preferred embodiment minimizes carbon dioxide emissions by calculating in real-time the available thermal hydraulic fluid with stored energy KWH1, comparing the projected energy required KWH3 to either reach the destination or reach the next off-peak time, and controlling at least one energy source selected from the group consisting of the combustion engine, and the waste heat recovery system recovering thermal energy from the combustion engine when KWH3 is greater than KWH1 plus KWH2. Avoiding or minimizing the combustion of CO2 producing fuels by leveraging available stored energy is a priority. When that is not possible, operating the power producing components yielding CO2 emissions is best when the waste heat from that cycle is subsequently utilized by the dual stage expansion cycle resulting in a net increase in energy efficiency.

Figure 19:
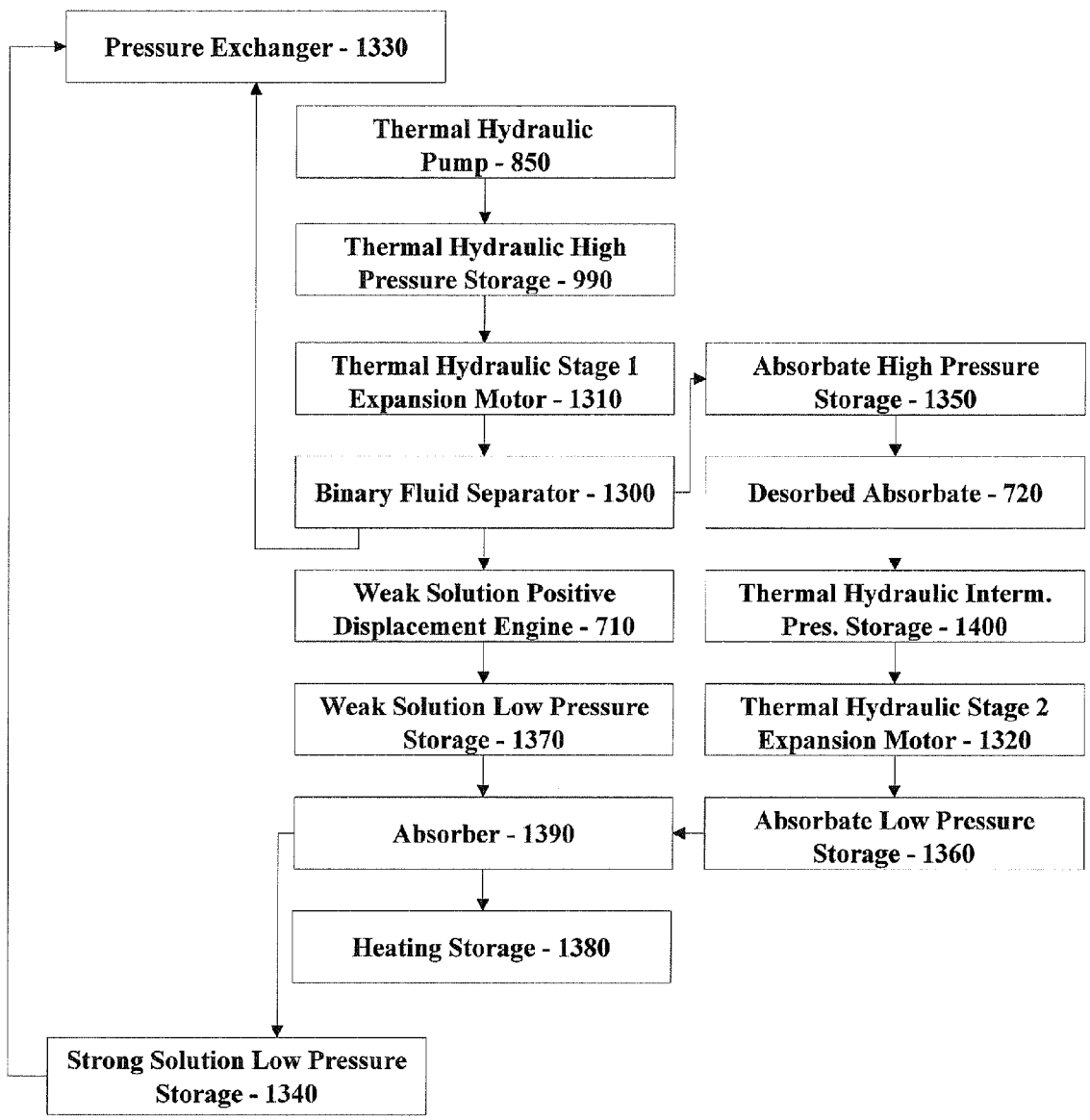
FIG. 19 is a schematic diagram depicting a binary fluid phase separation within an absorption system dual stage expansion stage energy conversion process.

FIG. 19 illustrates yet another embodiment of the dual stage expansion cycle energy production system having a first expansion stage discharge pressure and temperature yielding a thermal hydraulic fluid enthalpy H1. The thermal hydraulic fluid has an enthalpy H2 at the gas to liquid transition point. Many expansion devices, such as traditional turbines, can not have a significant amount of liquid at the discharge conditions, which requires any further expansion beyond the gas to liquid transition point to take place within other expansion devices not adversely impacted by significant liquid, thus the energy production system has a first stage discharge pressure and temperature where H1 is less than about 105% of H2 (i.e., prior to the gas to liquid transition point). The second stage expansion devices will typically be expansion devices that are positive displacement engines. One exemplary scenario of the dual stage expansion cycle starts with a Thermal Hydraulic Pump 850 to pressurize a binary fluid subsequently stored in the Thermal Hydraulic High Pressure Storage 990. The stored fluid is then expanded in the Thermal Hydraulic Stage 1 Expansion Motor 1310 to transform the thermal/hydraulic energy into electrical energy. The binary fluid is then separated in Binary Fluid Separator 1300 by a range of desorption methods as noted earlier and known in the art to fractionate the weak solution (i.e., high concentration absorbent) and Desorbed Absorbate 720 with optional storage of the desorbed absorbate in Absorbate High Pressure Storage 1350. The weak solution hydraulic energy is recovered and transferred by a Pressure Exchanger 1330 to partially increase the hydraulic energy of the strong solution obtained from the Strong Solution Low Pressure Storage 1340. Alternatively, the weak solution is expanded through a Weak Solution Positive Displacement Engine 710 to produce electrical energy and optionally stored in a Weak Solution Low Pressure Storage 1370 device prior to being combined with absorbate in Absorber 1390. The heat of absorption can be stored in a Heating Storage 1380 tank to be used for a range of purposes known in the art. The desorbed absorbate follows a parallel path with the minimum process steps of optional storage in Thermal Hydraulic Intermediate Pressure Storage 1400 tank, expanding the absorbate through Thermal Hydraulic Stage 2 Expansion Motor 1320 to generate additional electrical energy (or even mechanical energy as anticipated) and optionally storing the expanded absorbate in Absorbate Low Pressure Storage 1360 prior to regulating flow into the Absorber 1390.

Figure 20:
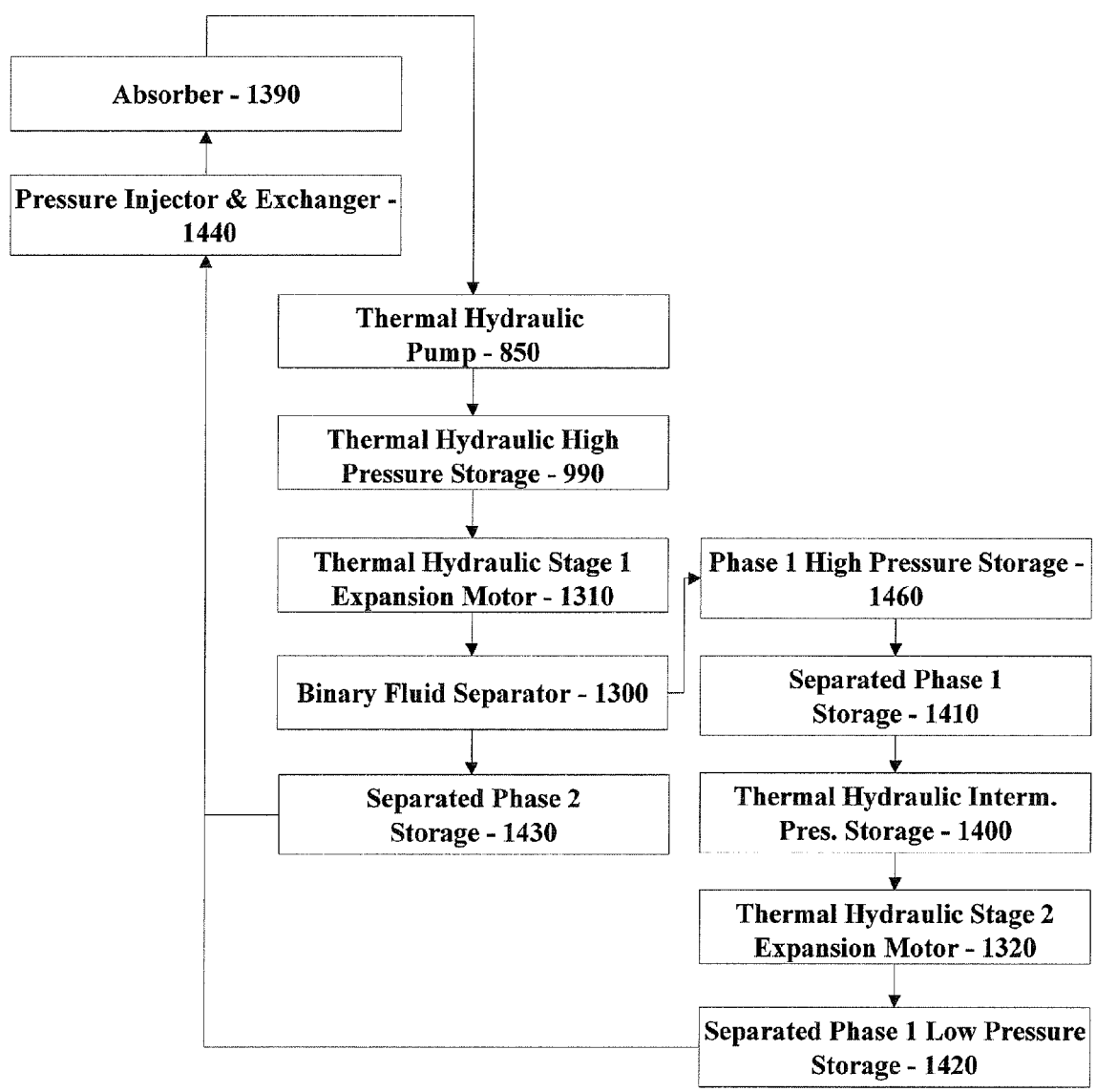
FIG. 20 is a schematic diagram depicting a binary fluid phase separation with two components that don't absorb in a dual stage expansion stage energy conversion process.

FIG. 20 illustrates another exemplary scenario of the dual stage expansion cycle starting with a Thermal Hydraulic Pump 850 to pressurize a binary fluid (but not an absorbate and absorbent with one example being CO2 and propane) subsequently stored in the Thermal Hydraulic High Pressure Storage 990. The stored fluid is then expanded in the Thermal Hydraulic Stage 1 Expansion Motor 1310 to transform the thermal/hydraulic energy into electrical energy. The binary fluid is then separated in Binary Fluid Separator 1300 by a range of separation methods as known in the art including membrane filtration (e.g., nanofiltration, electrodialysis, etc.) and one of the components being stored within Phase 1 High Pressure Storage 1460 with storage of phase 1 in Separated Phase 1 Storage 1410. The Phase 2 component of the original binary solution hydraulic energy is recovered and/or transferred by a Pressure Injector & Exchanger 1440 to at least partially increase the hydraulic energy of the now recombined phase 1 and phase 2 solution in Absorber 1390 (actually a mixer, though some heat of absorption is likely) obtained from the respective Separated Phase 1 Low Pressure Storage 1420 and Separated Phase 2 Storage 1430. The desorbed absorbate follows a parallel path with the minimum process steps of optional storage in Thermal Hydraulic Intermediate Pressure Storage 1400 tank, expanding the absorbate through Thermal Hydraulic Stage 2 Expansion Motor 1320 to generate additional electrical energy (or even mechanical energy as anticipated) and optionally storing the expanded absorbate in Separated Phase 1 Low Pressure Storage 1420 prior to regulating flow through the Pressure Injector & Exchanger 1440 into the Absorber 1390.

Another embodiment of the energy production system utilizes a binary thermal hydraulic fluid, non-thermal desorption method to separate absorbent and absorbate, and a thermal hydraulic fluid motor wherein the thermal hydraulic fluid desorption pressure is P1, wherein the maximum pressure for the bubbling point at temperature T1 is P2, and wherein P1 is greater than P2. Maximizing energy storage of any hydraulic fluid including a thermal hydraulic fluid is achieved by storing the fluid at the maximum pressure feasible P1 that exceeds P2. Utilizing non-thermal desorption methods enables the absorbate to be desorbed at pressures in which no bubbling point occurs at either the temperature T1 or even at no temperature for that pressure P1. The further integration of a weak solution positive displacement pump operating as expansion motor, and a thermal source to increase the enthalpy of the weak solution (when the weak solution has sufficient remaining absorbate to expand upon heating) portion of the thermal hydraulic fluid prior to expansion within the expansion motor enables more energy to be produced then required at the time the thermal hydraulic fluid was pumped to pressure P1. The yet further integration of an absorbate storage device, an expansion motor for the absorbate stream, and a thermal source wherein the thermal source increases the enthalpy of the thermal hydraulic fluid prior to expansion within the absorbate expansion motor yields net energy outputs as compared to a standard hydraulic storage system. Again the expansion motor enables more energy to be produced then required at the time the thermal hydraulic fluid was pumped to pressure P1.

Yet another embodiment is a hybrid absorption system as an energy production system that utilizes a binary thermal hydraulic fluid having component A1 and A2, at least two distinct expansion stages including a first expansion stage resulting in a thermal hydraulic fluid temperature higher than component A1 liquid phase transition, a subsequent phase separation process to fractionate the thermal hydraulic fluid into a second stream having less than about 10% on a weight basis of component A1, and a second expansion stage for the second stream to generate additional energy. There are at least two distinct advantages realized by this implementation, which are more energy is produced by greatly reducing (at least by about 80%) the heat of absorption as A1 and A2 are reabsorbed during the expansion stage, and the expansion stages final discharge pressure is lower by avoiding liquid phase transition of A1.

The invention has been described with reference to the various preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

The invention claimed is:

1. An energy storage system operable to control production, transmission and storage of energy, comprising:
    an energy generator arranged on a mobile transportation device and configured to create generated energy and a waste heat byproduct;
    an on-board energy storage device arranged on the mobile transportation device and operatively coupled to the energy generator for storing the generated energy;
    an external energy storage device arranged external to the mobile transportation device and communicably coupled to the energy generator for receiving a portion of the generated energy;
    a thermal energy storage device in thermal communication with the energy generator for storing the waste heat byproduct;
    a thermal hydraulic motor that circulates a thermal hydraulic fluid in thermal communication with the thermal energy storage device and having at least two distinct expansion stages for expanding the thermal hydraulic fluid to generate electrical energy for the on-board energy storage device or the external energy storage device; and
    a control system communicably coupled to the on-board energy storage device, the external energy storage device, and the thermal hydraulic motor, the control system being operable to vary a flow of the generated energy into the on-board energy storage device or the external energy storage device.

2. The energy storage system of claim 1, wherein the mobile transportation device further comprises a plug-in hybrid vehicle.

3. The energy storage system of claim 2, wherein the energy generator further comprises an internal combustion engine arranged on the plug-in hybrid vehicle.

4. The energy storage system of claim 2, wherein the thermal hydraulic motor is arranged at a residence.

5. The energy storage system of claim 4, further comprising a connector operatively associated with the plug-in hybrid vehicle and being operable to withdraw the thermal hydraulic fluid from the plug-in hybrid vehicle and direct thermal hydraulic fluid to the at least two expansion stages for expansion.

6. The energy storage system of claim 1, wherein the external energy storage device is arranged at a residence and the portion of the generated energy is used by the residence.

7. The energy storage system of claim 1, wherein the thermal energy storage device is arranged on the mobile transportation device.

8. The energy storage system of claim 7, wherein the thermal energy storage device further comprises a phase change material.

9. The energy storage system of claim 1, wherein the thermal energy storage device is arranged at a residence.

10. The energy storage system of claim 1, wherein the thermal hydraulic fluid further comprises super-critical carbon dioxide.

11. The energy storage system of claim 1, wherein the thermal hydraulic motor is arranged on the mobile transportation device.

12. The energy storage system of claim 1, wherein the control system determines an energy storage device charger profile to dynamically vary the flow of the generated energy into the on-board and external energy storage devices, the energy storage device charger profile being determined based on at least one of energy storage device energy requirements, energy storage device earliest start time, energy storage device latest finish time, energy storage device priority code, and energy storage device revenue code.

13. The energy storage system of claim 12, wherein the control system is further operatively coupled to the energy generator for controlling the energy generator and regulating a flow of the waste heat byproduct to the thermal energy storage device.

14. The energy storage system of claim 13, wherein the control system further determines a thermal energy storage device charger profile to dynamically vary the flow of the waste heat byproduct to the thermal energy storage device, the thermal energy storage device charger profile being based on at least one of byproduct waste heat energy requirements and real-time byproduct waste heat.

15. The energy storage system of claim 1, wherein the thermal energy storage device is further in thermal communication with the on-board energy storage device and the external energy storage device to recover generated waste heat.

16. The energy storage system of claim 1, wherein the thermal energy storage device is a first thermal energy storage device arranged on the mobile transportation device, the energy storage system further comprising a second thermal energy storage device arranged external to the mobile transportation device and in thermal communication with the energy generator for recovering a portion of the waste heat byproduct.

* * * * *